United States Patent
Sakuma et al.

(10) Patent No.: US 7,660,753 B2
(45) Date of Patent: Feb. 9, 2010

(54) INVENTORY CONTROL SYSTEM, INVENTORY CONTROL METHOD, FEE COLLECTION METHOD UTILIZED IN INVENTORY CONTROL SYSTEM, INVENTORY CONTROL PROGRAM, AND STORAGE MEDIUM

(75) Inventors: Toshiyuki Sakuma, Kawasaki (JP); Mitsuhiro Enomoto, Kamakura (JP); Hideyuki Sasaki, Fujisawa (JP); Yuichi Kaneko, Yokohama (JP); Mitsuhiro Hirano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 714 days.

(21) Appl. No.: 10/634,759

(22) Filed: Aug. 6, 2003

(65) Prior Publication Data
US 2004/0059649 A1 Mar. 25, 2004

(30) Foreign Application Priority Data
Aug. 6, 2002 (JP) ............................... 2002-228092

(51) Int. Cl.
*G06Q 10/00* (2006.01)
(52) U.S. Cl. .................. 705/28; 705/7; 705/8; 705/9; 705/10; 705/22; 705/29; 705/30
(58) Field of Classification Search ................ 705/28
See application file for complete search history.

(56) References Cited

U.S. PATENT DOCUMENTS 6,081,518 A * 6/2000 Bowman-Amuah ......... 370/352
6,629,081 B1 * 9/2003 Cornelius et al. ............. 705/30
6,904,449 B1 * 6/2005 Quinones ..................... 709/203
7,167,844 B1 * 1/2007 Leong et al. .................. 705/80
2002/0077979 A1 * 6/2002 Nagata ......................... 705/40
2002/0138314 A1 * 9/2002 Brown et al. ................... 705/7
2002/0161674 A1 * 10/2002 Scheer ......................... 705/28
2003/0023520 A1 * 1/2003 Burk et al. ..................... 705/30
2003/0028451 A1 * 2/2003 Ananian ....................... 705/27
2003/0055704 A1 * 3/2003 Reece ............................ 705/9

OTHER PUBLICATIONS

Avery, Susan, Hannan, David, Porter, Millen Anne. Supply chain management: Rx software that kills the pain. Sep. 2002. Purchasing, vol. 131, No. 15, p. SCOV1 (10).*

* cited by examiner

*Primary Examiner*—F. Zeender
*Assistant Examiner*—Fawaad Haider
(74) *Attorney, Agent, or Firm*—Mattingly & Malur, P.C.

(57) ABSTRACT

In a safety stock control system, safety stock is changed in response to updating of a setting value so as to be continuously maintained as a proper value. The safety stock control system is comprised of a demand prediction means, an actual value calculating means, a predicted remainder calculating means, a parameter calculating means, and a safety stock calculating means for calculating safety stock based upon a parameter calculated by the parameter calculating means. In response to updating of the setting value, data of an area, which is different from such a data read when a plan is made, is temporarily read from a data storage means to the respective means, and then, various sorts of calculating process operations are carried out either one time or plural times.

2 Claims, 40 Drawing Sheets

FIG.13

INFORMATION OF DEMAND OF PARTS NUMBER A01

TIMING OBTAINED BELOW-MENTIONED INFORMATION

| TIME | DATE | DEMAND AMOUNT | PLANNED DEMAND | ACTUAL DEMAND | PREDICTED REMAINDER | STANDARD DEVIATION |
|---|---|---|---|---|---|---|
|  |  |  |  |  |  |  |
| t-m | 1990/01/01 | 20 |  |  |  |  |
| t-m+1 | 1990/01/02 | 15 |  |  |  |  |
| t-m+2 | 1990/01/03 | 22 | 750 |  |  |  |
|  |  |  |  |  |  |  |
| t-i | 1999/01/01 | 31 |  | 770 | 20 |  |
|  |  |  |  |  |  |  |
| t-2 | 2000/12/30 | 51 |  |  |  |  |
| t-1 | 2000/12/31 | 14 |  |  |  |  |
| t | 2001/01/01 | 23 |  |  |  | 50 |
| t+1 | 2001/01/02 | 46 |  |  |  |  |
| t+2 | 2001/01/03 | 27 |  |  |  |  |
| t+3 | 2001/01/04 | 43 |  |  |  |  |
|  |  |  |  |  |  |  |
| t+13 | 2001/01/14 | 35 |  |  |  |  |
|  |  |  |  |  |  |  |
| t+20 | 2001/01/21 | 22 |  |  |  |  |
|  |  |  |  |  |  |  |
| t+27 | 2001/01/28 | 12 |  |  |  |  |
|  |  |  |  |  |  |  |
| t+34 | 2001/02/04 | 56 |  |  |  |  |
|  |  |  |  |  |  |  |
| t+j | 20XX/XX/XX | 47 |  |  |  |  |
|  |  |  |  |  |  |  |

PAST ↑ PRESENT TIME ↓ FUTURE

FIG.22

```
TICKET FILE

TICKET FILE NUMBER : 000001

(1) USER NUMBER                              : abcdefg
(2) CALCULATION SYSTEM                       : SYSTEM 1A (2001/01/05)
(3) USE FUNCTION NAME                        : SUPPLY PLAN, INVENTORY ANALYSIS
(4) TABLE DESIGNATION                        : WAREHOUSING/SHIPPING HISTORY TABLE,
                                               WAREHOUSING/SHIPPING ASSUMPTION TABLE
(5) RECORD RESTRICTION                       : FIXED (II AREA)
                                               (1999/01/01~2003/01/01)
(6) COLUMN RESTRICTION                       : NO
(7) DATA USE TIME LIMIT                      : DESIGNATE (2001/04/12)
(8) TIME-LIMIT APPROACHING NOTIFICATION      : YES
(9) NOTIFICATION TIMING                      : FIXED (ONE DAY BEFORE TIME LIMIT)
(10) DATA UPDATE                             : YES
(11) NUMBER OF TIMES OF DATA UPDATING        : FIXED (10 TIMES)
(12) TICKET FILE IS USED                     : USE LATER
     AFTER TICKET PURCHASE
_____

◎ TOTAL TICKET FILE FEE                      : 2,226 YEN
   (DETAILS)
     • DATA COPYING/WRITING FEE (SYSTEM 1A)  : 1,000 YEN
     • DATA READING CANCEL FEE (SYSTEM 2)    : 1,010 YEN
     • TIME-LIMIT-APPROACHING FEE            :    10 YEN
     • DATA UPDATING FEE                     :   100 YEN
     • CONSUMPTION TAX                       :   106 YEN

USER IDENTIFICATION SCREEN

USER NUMBER : abcdefg

PASSWORD : abc123

⋮

STOP    OK

FIG.26B

APPLICATION SCREEN

TICKET FILE PURCHASE APPLICATION

TICKET FILE USE APPLICATION

STOP

FIG.27

TICKET FILE PURCHASE SCREEN

| No | CALCU-LATION SYSTEM | USABLE FUNCTION TITLE | TABLE DESIGNATION | RECORD RESTRICTION | ... | PURCHASE UNIT | USE STARTING DAY OF TICKET FILE (USE TERM) | REMAINING TICKET FILE NUMBER | FEE | |
|---|---|---|---|---|---|---|---|---|---|---|
| 1 | 1B | STOCK ANALYSIS | NO DESIGNATION | NO RESTRICTION | ... | 10 SHEETS | NO DESIGNATION (2 DAYS) | 100 SHEETS | 2,000 YEN | TICKET FILE PURCHASE |
| 2 | 2 | NO DESIGNATION | NO DESIGNATION | OTHER THAN II AREA | ... | 1 SHEET | NO DESIGNATION (30 DAYS) | NO LIMITATION | 300 YEN | TICKET FILE PURCHASE |
| 3 | 1B | STOCK ANALYSIS, PRODUCTION PLAN | NO DESIGNATION | NO RESTRICTION | ... | 1 SHEET | NO DESIGNATION (7 DAYS) | 10 SHEETS | 500 YEN | TICKET FILE PURCHASE |
| 4 | 1B | NO DESIGNATION | NO DESIGNATION | NO RESTRICTION | ... | 1 SHEET | 2001/08 (7 DAYS) | 20 SHEETS | 500 YEN | TICKET FILE PURCHASE |
| 5 | 1A | NO DESIGNATION | NO DESIGNATION | NO RESTRICTION | ... | 1 SHEET | 2001/01/06 (1 DAYS) | 5 SHEETS | 700 YEN | TICKET FILE PURCHASE |
| ... | ... | ... | ... | ... | ... | ... | ... | ... | ... | |

RETURN    CUSTOM

FIG.28

```
CUSTOM-PURPOSE TICKET PURCHASING SCREEN (1) USER NUMBER:            [abcdefg]
(2) CALCULATION SYSTEM:

● SYSTEM 1A: SERVER MACHINE "γ" IS USED (RESERVATION)    [CONDITION] [2001/01/05 RESERVE "γ 1"]
    ○ SYSTEM-1B: EMPTY SERVER MACHINE "γ" IS USED
                 (PARALLEL CALCULATION IS EXECUTED UNDER EMPTY CONDITION)
    ○ SYSTEM-2 : CALCULATION IS PERFORMED ONLY BY SERVER MACHINE "β"
(3) USE FUNCTION NAME:
    ○ DEMAND PLAN
      SUPPLY PLAN
      INVENTORY ANALYSIS
      ...
(4) TABLE DESIGNATION:
    ● DESIGNATE                    [HISTORY TABLE]        [ASSUMPTION TABLE]
    ○ NOT DESIGNATE (ONLY HISTORY TABLE)
(5) RECORD RESTRICTION:            [            ] ~ [            ]
    ○ DESIGNATE
      FIXED (a: 2 YEARS BEFORE PRESENT TIME [1999/01/01], b: 2 YEARS AFTER PRESENT TIME [2003/01/01])
        ○ I AREA (SMALLER THAN "a")              : USED TO VERIFY PREDICTION PRECISION
          II AREA                                : USED IN INVENTORY PREDICTION,
          (LARGER THAN, OR EQUAL "a" AND SMALLER THAN "b")   SHORT-TERM DETAIL INVENTORY PLAN, AND THE LIKE
        ○ III AREA (LARGER THAN, OR EQUAL TO "b"): USED IN LONG-TERM MASTER INVENTORY PLAN AND
                                                   THE LIKE
    ○ NO (6) COLUMN RESTRICTION:    ○ YES       [            ]        ● NO
(7) DATA USE TIME LIMIT:   ● DESIGNATE [2001/04/12]          ○ FIXED (1 MONTH)
(8) TIME LIMIT APPROACHING ● YES                             ○ NO
    NOTIFICATION:
(9) TIMING OF NOTIFICATION: ○ DESIGNATE [yyyy/mm/dd]         ● FIXED
                                                               (ONE DAY BEFORE TIME LIMIT)
(10) DATA UPDATE:          ● YES                             ○ NO
(11) DATA UPDATE TIME:     ○ DESIGNATE [            ]        ● FIXED (10 TIMES)
(12) TICKET FILE IS USED   ○ IMMEDIATELY USE                 ● USE LATER
     AFTER TICKET FILE
     PURCHASE:

[ RETURN ]       [ CALCULATE FEE ]       [ PURCHASE TICKET FILE ]
```

FIG.29

SERVER MACHINE-γ RESERVATION CONDITION SCREEN

| DATE | γ1 (HIGH PERFORMANCE MACHINE) | γ2 (HIGH PERFORMANCE MACHINE) | γ3 (HIGH PERFORMANCE MACHINE) | ... | γi (MEDIUM PERFORMANCE MACHINE) | ... |
|---|---|---|---|---|---|---|
| 2001/01/01 | RESERVED | RESERVED | EMPTY | ... | EMPTY | ... |
| 2001/01/02 | RESERVED | RESERVED | RESERVED | ... | EMPTY | ... |
| 2001/01/03 | RESERVED | RESERVED | EMPTY | ... | EMPTY | ... |
| 2001/01/04 | RESERVED | RESERVED | RESERVED | ... | EMPTY | ... |
| 2001/01/05 | RESERVATION APPLICATION | EMPTY | EMPTY | ... | RESERVED | ... |
| 2001/01/06 | EMPTY | EMPTY | EMPTY | ... | RESERVED | ... |
| ... | ... | ... | ... | ... | ... | ... |

RETURN    OK

FIG.30

TICKET FILE FEE

TOTAL TICKET FILE FEE AMOUNT    : 2,226 YEN
    (DETAILS)

- DATA COPYING/WRITING FEE (SYSTEM 1A)   : 1,000 YEN
- DATA READ-PROHIBITION LIFTING FEE (SYSTEM 2)   : 1,010 YEN
- TIME LIMIT APPROACHING NOTIFICATION FEE   : 10 YEN
- DATA UPDATING FEE   : 100 YEN
- CONSUMPTION TAX   : 106 YEN

[ RETURN ]    [ TICKET FILE PURCHASE ]

FIG.32

DATA UPDATE SCREEN

TICKET FILE NUMBER : 000002

| | |
|---|---|
| (1) USER NUMBER | : abcdefg |
| (2) CALCULATION SYSTEM | : SYSTEM 1B |
| (3) USE FUNCTION NAME | : SUPPLY PLAN, INVENTORY ANALYSIS |
| (4) TABLE DESIGNATION | : WAREHOUSING/SHIPPING HISTORY TABLE WAREHOUSING/SHIPPING ASSUMPTION TABLE |
| (5) READ RESTRICTION | : FIXED (II AREA) (1999/01/01~2003/01/01) |
| (6) COLUMN RESTRICTION | : NO |
| (7) DATA USE TIME LIMIT | : DESIGNATE (2001/04/12) |
| (8) TIME-LIMIT APPROACHING NOTIFICATION | : YES |
| (9) NOTIFICATION TIMING | : FIXED (ONE DAY BEFORE TIME LIMIT) |
| (10) DATA UPDATE | : YES |
| (11) DATA UPDATING TIME | : FIXED (10 TIMES) |
| (12) TICKET FILE IS USED AFTER TICKET PURCHASE | : USE LATER |

[ RETURN ]   [ DATA UPDATE ]

FIG.35

◎ WAREHOUSING/SHIPPING HISTORY TABLE

| RECORD NO | PARTS NUMBER | WAREHOUSING/ SHIPPING JUDGEMENT FLAG | DATE/TIME | AMOUNT | . . . |
|---|---|---|---|---|---|
| 1 | a01 | 1 | 1990/01/01 | 20 | |
| | | | | | |
| i | a01 | 1 | 1990/01/01 | 7000 | |
| | | | | | |
| n | z99 | 1 | 1990/12/31 | 500 | |

◎ WAREHOUSING/SHIPPING ASSUMPTION TABLE

| RECORD NO | PARTS NUMBER | WAREHOUSING/ SHIPPING JUDGEMENT FLAG | DATE/TIME | AMOUNT | . . . |
|---|---|---|---|---|---|
| 1 | a01 | 1 | 2001/01/01 | 400 | |
| | | | | | |
| i | a01 | 1 | 2003/01/01 | 100 | |
| | | | | | |

FIG.38

MACHINE-PERFORMANCE-DEPENDING UNIT PRICE TABLE

| MACHINE PERFORMANCE | UNIT PRICE | ... |
|---|---|---|
| HIGH PERFORMANCE | 1000 | |
| MEDIUM PERFORMANCE | 500 | |
| ... | | |

UNIT PRICE TABLE FOR TIME-LIMIT-APPROACHING NOTIFICATION FEE

| ISSUE/NOT-ISSUE TIME-LIMIT-APPROACHING NOTIFICATION FEE | UNIT PRICE | ... |
|---|---|---|
| YES | 10 | |
| NO | 0 | |

UNIT PRICE TABLE OF DATA UPDATING FEE

| DATE UPDATING TIME | UNIT PRICE | ... |
|---|---|---|
| LARGER THAN, OR EQUAL TO 1 TIME, AND SMALLER THAN 100 TIMES | 10 | |
| ... | | |

/ # INVENTORY CONTROL SYSTEM, INVENTORY CONTROL METHOD, FEE COLLECTION METHOD UTILIZED IN INVENTORY CONTROL SYSTEM, INVENTORY CONTROL PROGRAM, AND STORAGE MEDIUM

BACKGROUND OF THE INVENTION

The present invention generally relates to an inventory (stock)control technique. More specifically, the present invention is directed to an inventory control system, an inventory control method, and an inventory control program, capable of setting safety stock (safety inventory), and also, is directed to a method for collecting a use fee of this inventory control program, and a storage medium for storing thereinto the inventory control program.

Inventory amounts of items such as products and parts are required to be controlled in correspondence with demands for these items, while these items designate a general term with respect to products, parts, components, half-made products, unfinished products (or in-process items), and materials, or designate any one of these products/materials. In general, however, since demands are continuously varied, when inventory amounts are determined, excessive inventory amounts must be secured in order to be capable of accepting these demand variations. Such an inventory capable of establishing safety by securing an excessive inventory amount will be referred to as "safety stock" hereinafter. Generally speaking, a formula of calculating a so-called "safety stock" may be expressed as follows:

safety stock=$\alpha \times \sqrt{T} \times \sigma$, where symbols are defined by: $\alpha$: safety factor, T: planned range, $\sigma$: fluctuation of demands (standard deviation).

In the above-described calculation formula, the planned range is obtained by totalizing a planning cycle, a procurement lead time, and a plan lead time. In this case, a term "lead time" implies such a time period that after an order is issued, a work is carried out until this order is accomplished. FIG. 39 and FIG. 40 represent a relationship among the planned range, the planning cycle, the procurement lead time, and the plan lead time. In the example shown in FIG. 39, the plan lead time corresponds to 2 days; the procurement lead time corresponds to 4 days; the planning cycle corresponds to 7 days; and the planned range corresponds to 13 days obtained by totalizing these days. Also, in the example shown in FIG. 40, the plan lead time corresponds to 2 days; the procurement lead time corresponds to 4 days; the planning cycle corresponds to 1 day; and the planned range corresponds to 7 days obtained by totalizing these days.

To set safety stock, arbitrary values are substituted for "$\alpha$", "T", and "$\sigma$" of the above-explained safety stock calculation formula. Also, there is another method capable of setting arbitrary values as safety stock without employing the above-described safety stock calculating formula.

Next, a description will now be made of a conventional technique as to fee collecting methods of software.

As the conventional fee collecting methods for software, the below-mentioned fee collecting methods have been proposed:

(1) Fee Collecting Method in Product Purchasing Form:

In this fee collecting method, software which has been stored in a recording medium such as a floppy (R) disk and a compact disk is purchased so as to be used.

(2) Service-fixed-sum Fee Collecting Method:

In this fee collecting method, software itself is not purchased. A fixed sum is paid to a software providing company every predetermined time period (for example, every month) as a software lease fee, or a software use fee.

(3) Provided-service-sum Fee Collecting Method:

In this fee collecting method, software itself is not purchased. A fee is paid to a software providing company in response to time and a frequency at which the software is utilized.

In the examples indicated in FIG. 30 and FIG. 40, the plan lead time corresponds to 2 days; the procurement lead time corresponds to 4 days; and the planning cycles are 7 days and 1 day, respectively. Very recently, there is such a trend that since management environments are changed, manufacturing speeds of products are improved, and high-performance information systems have been developed, the above-described planning cycles, procurement lead time, and plan lead time are shortened. Furthermore, such chances for updating these cycles/lead times are increased. In general, when a planning cycle is shortened in unit of a week, or a day, an inventory amount may be reduced. On the other hand, if safety stock is mistakenly set, then product depletion may occur and/or excessive inventory may be increased. As a consequence, the following inventory control operation is necessarily required. That is, in this inventory control operation, while safety stock is changed in response to updating of such setting values as a planning cycle, a procurement lead time, and a plan lead time, the safety stock is continuously maintained as a proper value.

However, the above-described safety stock calculating formula explained in the conventional technique has been established based upon several assumptions, for example, it is so assumed that a remainder distribution of demand data is constant. As a result, there is no guarantee that the above-described safety stock continuously constitutes the proper value, while this safety stock has been acquired by substituting the planning cycle and the various lead times for this safety stock calculating formula. As a consequence, in order to calculate such a proper safety stock to which updating of the planning cycle and the various lead times may be correctly reflected, several pieces of featured calculating process operations must be carried out.

Next, problems as to the conventional software fee collecting methods will now be explained.

Currently, there is a trend that such client enterprises are increased which use various sorts of software, while utilizing outsourcing services provided by application service providers (will be referred to as "ASP" hereinafter) in order to reduce expenses required to purchase and maintain software. In the case that various sorts of software are used by utilizing outsourcing services, fee collecting methods for uses of desirable software are defined by selecting the above-explained (2) service-fixed-sum fee collecting method, or (3) provided-service-sum fee collecting method, or employing both these fee collecting methods (2) and (3) as explained in the conventional technique. In this selection case, generally speaking, there is such a trend that client enterprises may select either the service-fixed-sum fee collecting method or the provided-service-sum fee collecting method combined with this service-fixed-sum fee collecting method due to such a reason that these client enterprises may easily make up budgets for receiving software services.

However, these conventional fee collecting methods own the below-mentioned problems.

First of all, although the service-fixed-sum fee collecting method own such a merit that a service fee is fixed and a budget may be readily made up, this service-fixed-sum fee collecting method never corresponds to such a fee collecting system capable of detrmining a fee by checking as to whether or not software is essentially used. As a consequence, this service-fixed-sum fee collecting method may give advantages to such clients who use software for long time and at higher frequencies. However, this service-fixed-sum fee collecting method cannot give satisfaction to other clients who use software at lower frequencies.

Also, in such a case that the service-fixed-sum fee collecting method is combined with the provided-service-sum fee collecting method, clients necessarily pay use fees of software later after these clients have utilized the software. Accordingly, software providing forms always own some risks of collecting use fees from these clients.

As previously explained, the above-explained conventional fee collecting methods cannot give satisfaction with respect to both the clients who use the software at lower frequencies and also these software providing firms.

SUMMARY OF THE INVENTION

While the above-described problems can be solved, such an inventory control system and an inventory control method have been desired, by which safety stock is changed in response to updating of a setting value such as a planning cycle, a procurement lead time, and a plan lead time so as to continuously maintain this safety stock as a proper value.

Also, such a fee collecting method have been wanted to be proposed, by which a provider capable of providing a function of an inventory control system can firmly collect use fees without any risks as to use fee collections, and also can charge fair use fees to clients, whereas these clients can readily make up budgets properly adapted to actually-used amounts and can pay use fees reflecting the actually-used amounts.

A concept of the present invention is to solve the above-explained problems.

To achieve the concept, an inventory control system, according to an aspect of the present invention, is featured by comprising: demand predicting means for calculating a predicted value of a demand; actual value calculating means for calculating an actual value which is compared with the predicted demand value; predicted remainder calculating means for calculating a difference between the predicted demand value and the actual value; parameter calculating means for calculating a parameter such as standard deviation by employing the predicted remainder; and safety stock calculating means for calculating safety stock based upon the parameter.

Also, in the inventory control system of the present invention, since a setting value such as a planning cycle, a plan lead time, and a procurement lead time is updated, data of an area, which is different from such data read when the plan is made, is read from data storage means into the demand predicting means, the actual value calculating means, the predicted remainder calculating means, the safety stock calculating means, and the parameter calculating means so as to execute various sorts of calculating process operation either one time or plural times.

Also, the inventory control system of the present invention is further comprised of: a management server machine including input means for accepting an input of a table name which is wanted to be used when the function of the inventory control system is used, and ticket file issuing means for issuing a ticket file based upon the preset fee system in response to a sort of the table and for transmitting the issued ticket file to a client machine; and a plurality of server machines including at least any one of data copying/writing means and data reading control means, the data copying/writing means copying data of a designated table from the data-source storage unit for storing thereinto the plurality of tables based upon information indicated in the ticket file, and the data reading control means for controlling to read the data of the designated table based upon the information indicated in the ticket file with respect to the data-source storage unit for storing the plurality of tables.

Further, in the inventory control system of the present invention, the input means accepts an input of either a designation of a record range or a designation of a data amount as to a table which is wanted to be used by a client; and the fee collecting means collects a fee in response to information as to either the record range designation or the data amount designation.

Other objects, features and advantages of the invention will become apparent from the following description of the embodiments of the invention taken in conjunction with the accompanying drawings.

BRIEF DESCRIPTION OF THE DRAWINGS

FIG. 13 is a diagram for indicating another range of data employed in a calculating process operation of safety stock.

FIG. 22 is a diagram for representing a content of a ticket file.

FIGS. 26A and 26B illustratively show an example of output screens of the client machine.

FIG. 27 illustratively indicates another example of an output screen of the client machine.

FIG. 28 illustratively represents another example of an output screen of the client machine.

FIG. 29 illustratively shows another example of an output screen of the client machine.

FIG. 30 illustratively indicates another example of an output screen of the client machine.

FIG. 32 illustratively shows another example of an output screen of the client machine.

FIG. 35 is an explanatory diagram for explaining a record restriction.

FIG. 38 is a diagram for explaining another mode of the fee system.

DESCRIPTION OF THE EMBODIMENTS

Referring now to drawings, embodiments of the present invention will be described.

First, a description will now be made of an evaluation with respect to an inventory control system according to the present invention.

(1) Evaluation of Functions of Inventory Control System

Very recently, there is a supply chain planning (will be referred to as "SCP" hereinafter) system as an information system which is gradually commenced to be used in enterprises. A major function of this SCP (supply chain planning) system corresponds to a demand plan function, a supply plan function, and a deadline response function. As another system, there is a manufacturing execution system (will be referred to as "MES" hereinafter). A major function of this MES system corresponds to a function such as a progress management. An inventory control system defined in accordance with an embodiment of the present invention may be quipped with an inventory analysis function capable of analyzing inventory in addition to both the demand plan function and the supply plan function of the SCP system, and also, the progress management function of the MES system. In other words, this inventory control system corresponds to a so-called "new system" which may be realized by expanding the functions of the SCP system.

(2) Hardware Structure of Inventory Control System

Next, a hardware structure of an inventory control system of the present invention will now be described.

Figure 1:
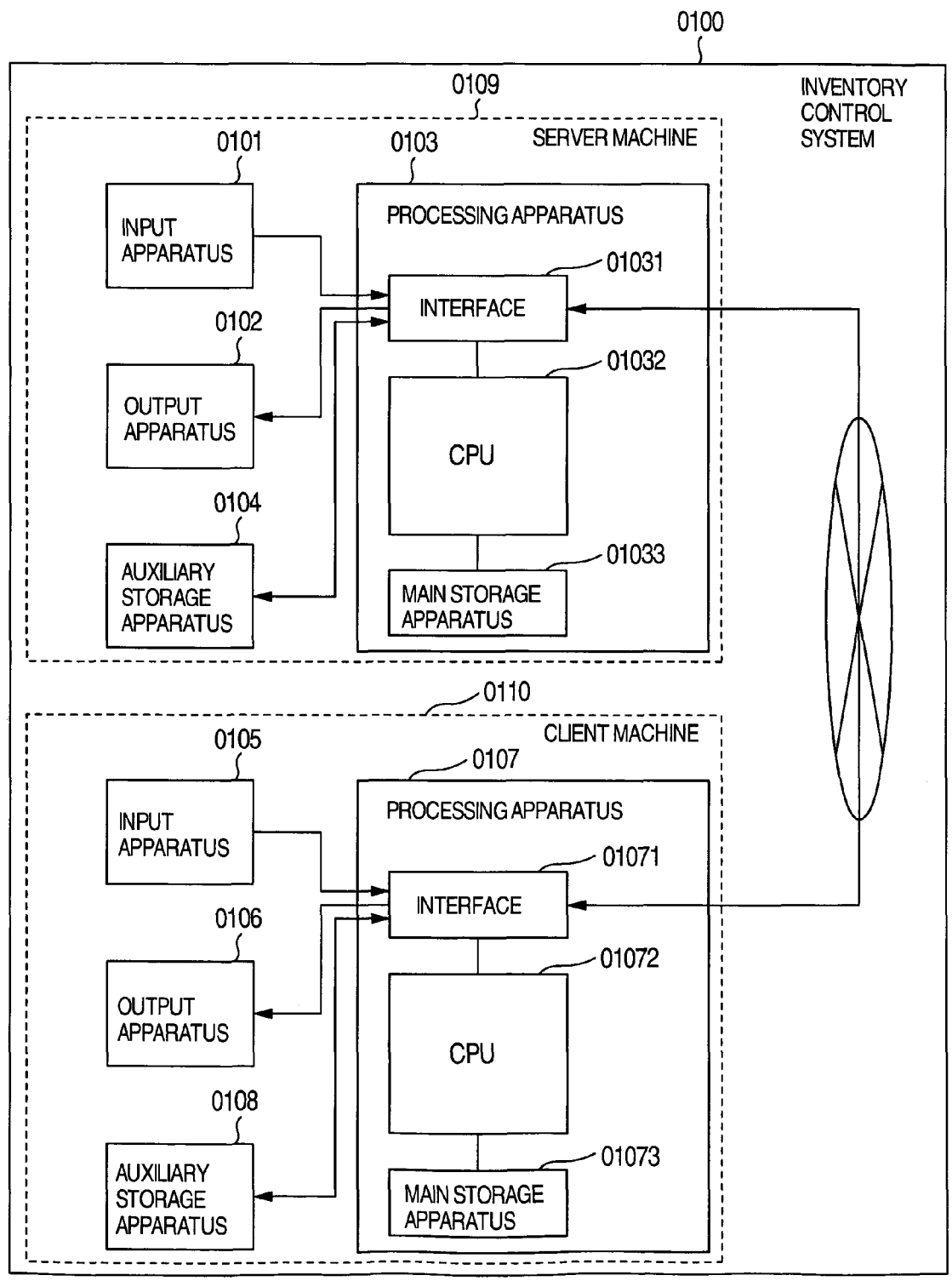
FIG. 1 is a diagram for schematically showing a hardware structure of an inventory control system according to an embodiment mode of the present invention.

FIG. 1 is a diagram for representing a hardware structure of an inventory control system according to an embodiment of the present invention.

In FIG. 1, an inventory control system 0100 of this embodiment is constituted by connecting a server machine 0109 for providing an inventory control program via a communication line to a client machine 0110 using this inventory control program. In this case, plural sets of client machines may be alternatively employed, and plural sets of server machines may be alternatively employed so as to constitute the inventory control system 0100.

The server machine 0109 contains an input apparatus 0101, an output apparatus 0102, an auxiliary storage apparatus 0104, and a processing apparatus 0103. The input apparatus 0101 corresponds to a keyboard, a mouse, and the like. The output apparatus 0102 corresponds to a display and the like. The processing apparatus 0103 executes an inventory control program and a fee collecting process operation. The processing apparatus 0103 is equipped with an interface 01031, a central processing unit (will be referred to as "CPU" hereinafter) 01032, and a main storage apparatus 01033. This processing apparatus 0103 is connected via the interface 01031 to the input apparatus 0101, the output apparatus 0102, and the auxiliary storage apparatus 0104.

The client machine 0110 contains an input apparatus 0105, an output apparatus 0106, an auxiliary storage apparatus 0108, and a processing apparatus 0107. The input apparatus 0105 corresponds to a keyboard, a mouse, and the like. The output apparatus 0106 corresponds to a display and the like. The processing apparatus 0107 executes an inventory control program and a fee collecting process operation. The processing apparatus 0107 is equipped with an interface 01071, a central processing unit (will be referred to as "CPU" hereinafter) 01072, and a main storage apparatus 01073. This processing apparatus 0107 is connected via the interface 01071 to the input apparatus 0105, the output apparatus 0106, and the auxiliary storage apparatus 0108.

In this embodiment, a process result of the inventory control program is stored in a storage area which is secured in the main storage apparatus 01033 on the side of the server machine 0109, whereas this processed result is stored in the main storage apparatus 01073 on the side of the client machine 0110. The inventory control program has been previously stored in the auxiliary storage apparatus, and is read into the main storage apparatus 01033 and 01073. Then, the read programs are executed by the CPU 01032 and the CPU 01072.

In this embodiment, a description is made of such an example that the inventory control system may be realized by general-purpose information processing apparatus and software. For instance, this inventory control system may be alternatively realized by way of hardware containing hard-wired logics and previously-programmed general-purpose information processing apparatus.

It should also be noted that in this embodiment, an inventory control system may cover not only such a case that both the entire structure provided in the server machine and the entire structure provided in the client machine are designated, but also another case that the structure of the server machine is designated. (3) Functions of Inventory Control System Next, functions of the inventory control system will now be described. The inventory control system, according to this embodiment, owns basic functions such as the demand plan (demand scheme) function, the supply plan (supply scheme)

function, the progress management function, the inventory analysis function, and so on, which are described in the above-described item (1) "EVALUATION OF INVENTORY CONTROL SYSTEM." The demand plan function implies such a function that a demand is predicted so as to make up a demand plan. The supply plan function implies such a function that a supply plan with respect to the predicted demand is made up. The progress management function implies such a function capable of managing progress by checking, or comparing the supply plan with respect to actual production and actual inventory. The inventory analysis function implies such a function capable of controlling safety stock based upon the progress management. In addition, the inventory control system also owns a reference setting function. This reference setting function is required in order to set several reference values before these functions are executed. In the respective functions such as the demand plan function, the supply plan function, the progress management function, and the inventory analysis function, process operations are executed with reference to the reference setting operations thereof.

Figure 2:
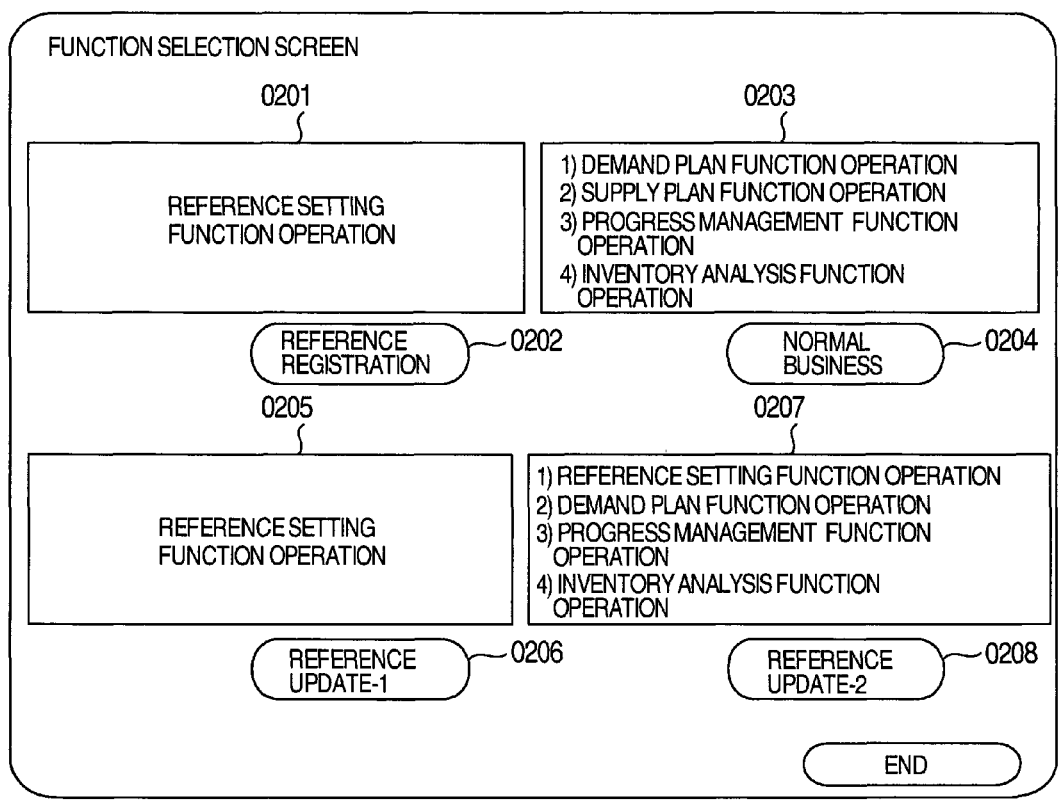
FIG. 2 is an example of an output screen of a client machine.

FIG. 2 shows an example of a screen displayed on the side of the client machine, which is used to initiate the above-explained respective functions. In FIG. 2, the client may select a reference registering button 0202, a normal business button 0204, a reference updating-1 button 0206, and a reference updating-2 button 0208. The reference registering button 0202 is to operate the reference setting function. The normal business button 0204 is to operate a normally-used function. The reference updating-1 button 0206 is to update a reference setting value in the normal business flow operation. The reference updating-2 button 0208 is to operate an updating process operation of a featured reference setting value of the present invention. The reference setting function operated by the reference registering button 0202 is selected before the inventory control system is used so as to register the reference setting value. The normal business operated by the normal business button 0204 corresponds to the normally-used function. In this normal business, the process operations as to the demand plan, the supply plan, the progress management, and the inventory analysis are carried out in this order. The function operated by the reference updating-1 button 0206 corresponds to a function capable of updating the reference setting value of the normal business function. It should be noted that a change in the reference setting values is not automatically reflected to other process operations. The function operated by the reference updating-2 button 0208 corresponds to such a featured function of the present invention in which when the reference setting value is changed, this changed reference setting value is automatically reflected so as to execute the respective process operations as to the demand plan, the progress management, and the inventory analysis. A detailed description will be made of contents of process operations operated when the respective buttons are selected.

(3.1) Reference Setting Process Operation

First, reference setting process operation will now be explained.

Figure 3:
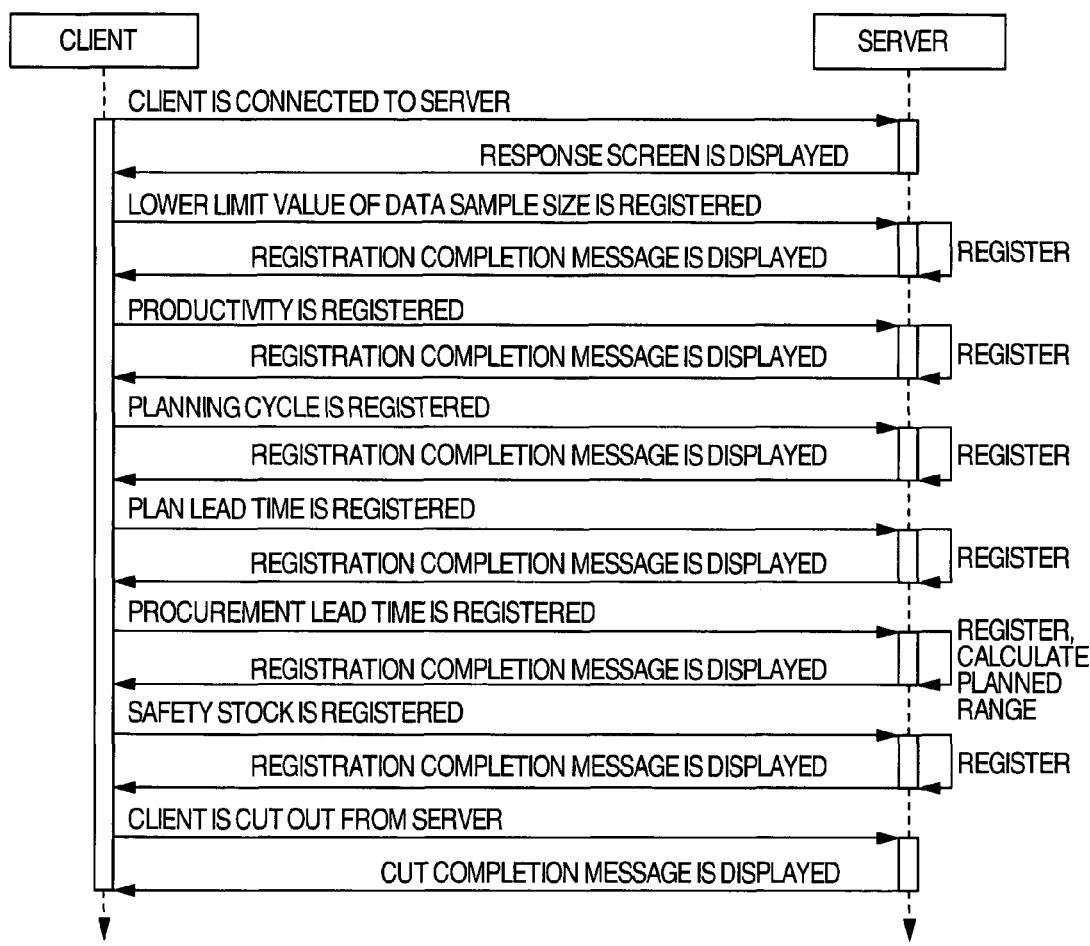
FIG. 3 is a diagram for indicating a flow operation as to a reference registering process operation.

FIG. 3 is a sequence diagram for indicating a flow operation as to the reference setting function operated in the case that the reference registering button 0202 of FIG. 2 is selected.

As shown in FIG. 3, a user of the side of a client is firstly connected to a server. Although being omitted in sequence diagrams from FIG. 3 to FIG. 8, a user identification is firstly carried out on the side of the server. On the side of the server, the function selection screen as shown in FIG. 2 is displayed as a response screen. When the user selects the reference registering button 0202 of FIG. 2, the reference setting function is initiated. In accordance with the screen displays, the user registers a lower limit value of a data sample size, a manufacturing capability, a planning cycle, a plan lead time, a procurement lead time, safety stock, and the like. When the planning cycle, the plan lead time, and the procurement lead time are registered in the server, a planning range is calculated based upon these registered items. Every time the registering operations as to these items have been accomplished, a registering completion message is displayed from the server side. In such a case that only the reference setting function is utilized, after the setting operations of the respective items have been completed, the server executes a cutting process operation, and then displays a cutting completion message, so that the reference function setting process operation is accomplished.

In any of the below-mentioned sequence diagrams, connections with respect to servers are indicated in head portions of the sequence diagrams, whereas cutting process operations for servers are indicated in last portions of the sequence diagrams. In such a case that clients have already been connected to servers, and connections with respect to servers are not cut after the reference setting function has been utilized, these process operations are omitted.

(3.2) Normal Business Process Operation

Next, a description will now be made of normal business process operations executed in such a case that the user selects the normal business processing button 0204 of FIG. 2.

Such a user that the registration of the reference setting item has been completed may utilize the normal business processing operation equipped with the respective functions, namely, the demand plan function, the supply plan function, the program management function, and the inventory analysis function indicated in a menu 0203 of FIG. 3. A program used to execute a process operation corresponds to a diagram which is employed in the below-mentioned explanation, and has been stored in a software storage unit of an application portion indicated in FIG. 17. This process program is read in a software processing portion so as to execute the process operation.

Figure 4:
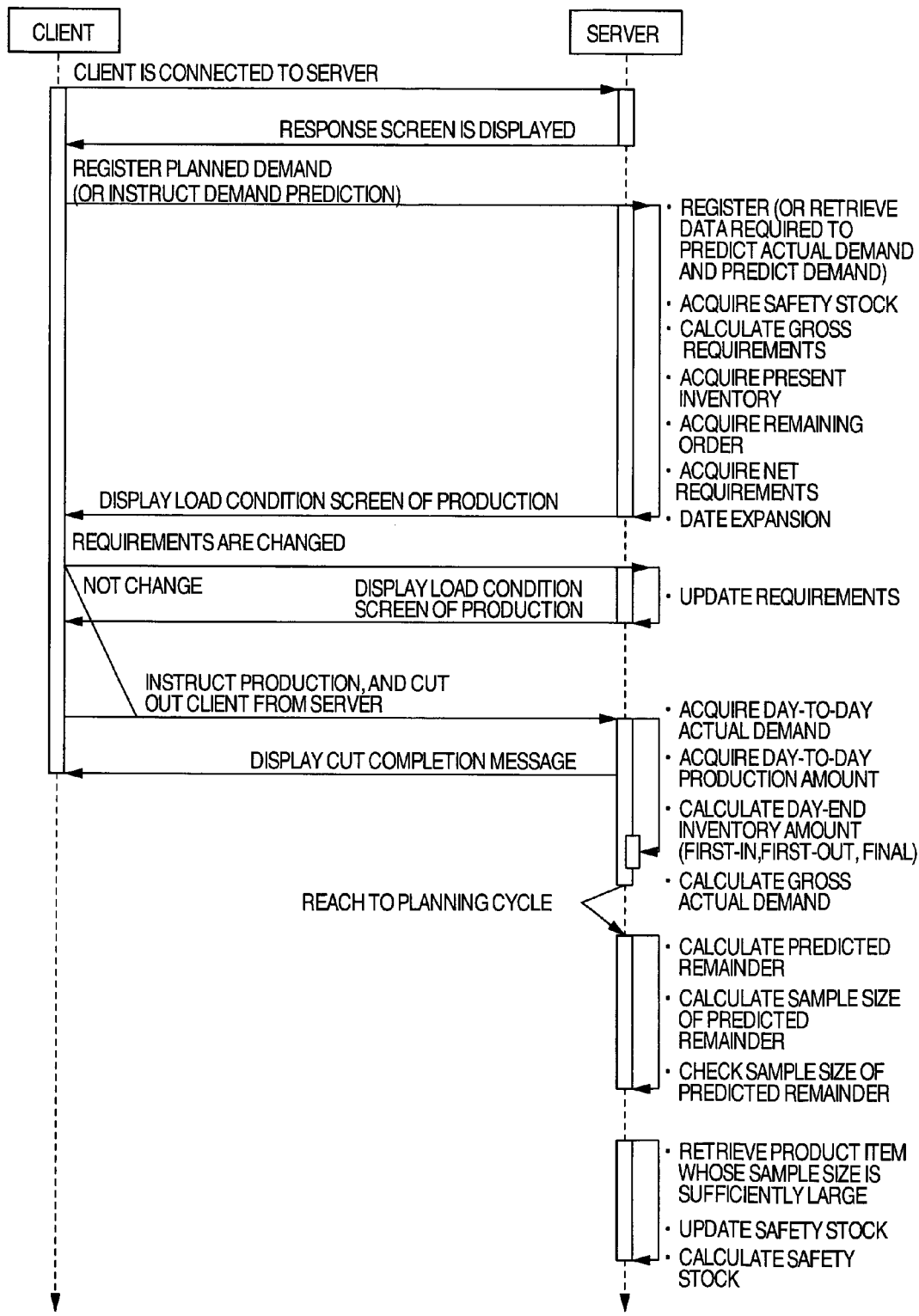
FIG. 4 is a diagram for representing a flow operation as to a normal business processing operation.

In the normal business process operation, as represented in the menu 0203 of FIG. 3, the process operations are carried out in this order from item 1 to item 4. FIG. 4 is a sequence diagram for explaining a flow operation of the normal business processing operation.

Figure 9:
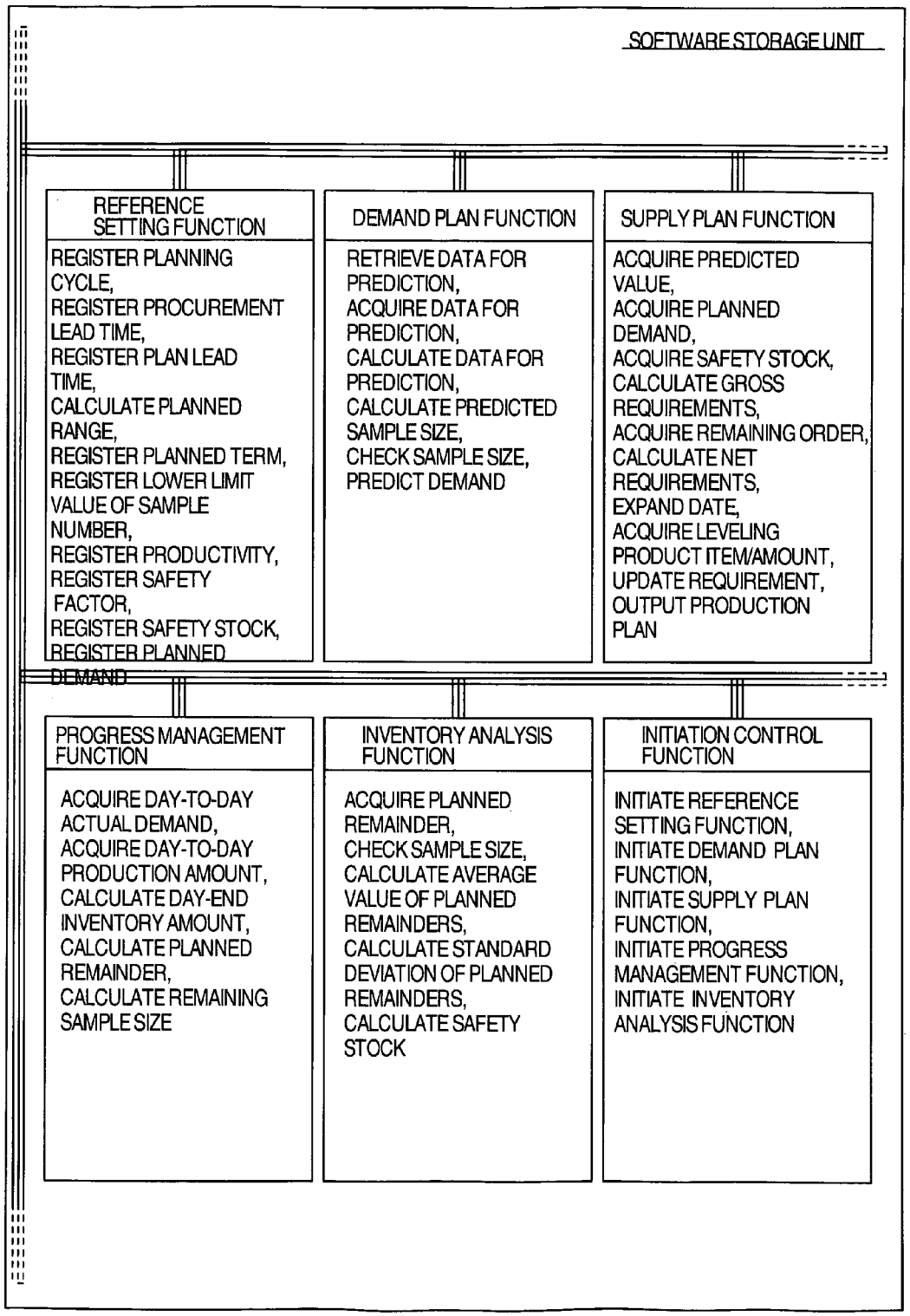
FIG. 9 is an image diagram of a software storage unit.

As indicated in the sequence diagram of FIG. 4, when a user on the side of a client is firstly connected to a server, a response screen is displayed on the side of the server. The user selects the normal business button 0204 of FIG. 2, and firstly initiates the item 1 of the demand plan function so as to register a planned demand, or instruct a demand prediction. Upon receipt of this registration/instruction, as indicated in FIG. 9, a program of the demand plan function of the software storage unit is carried out on the side of the server. To register the planned demand, there are one case that such a demand predicted result is registered which has already been predicted based upon data, and another case that a predicted demand which has been set by the user is registered.

In the case that a calculated demand is registered, the registering process operation is carried out, whereas in such a case that a demand prediction is carried out, the demand is predicted by retrieving prediction data, by acquiring prediction data, and by executing a function of accumulation. Then, such process operations as a safety stock acquisition, a gross requirements calculation, a present inventory acquisition, a net requirements calculation, a date extension are carried out, and thereafter, a load condition of production, which has been obtained by these process operations, is displayed on the screen on the side of the client.

On the side of the client, in such a case that a predetermined amount is corrected based upon this display content, a product name and an amount of this product are designated so as to change this predetermined amount. On the side of the server, the predetermined amount is updated, and a load condition of such a production to which the changed result has been reflected is displayed on the screen on the side of the client. Then, the connection to the server is cut.

It should also be noted that an initiation control function of FIG. 9 is not indicated in FIG. 2, but corresponds to a program having a function capable of executing initiation controls of the respective process operations.

(3.3) Updating Process Operation-1 of Reference Setting Value

Figure 5:
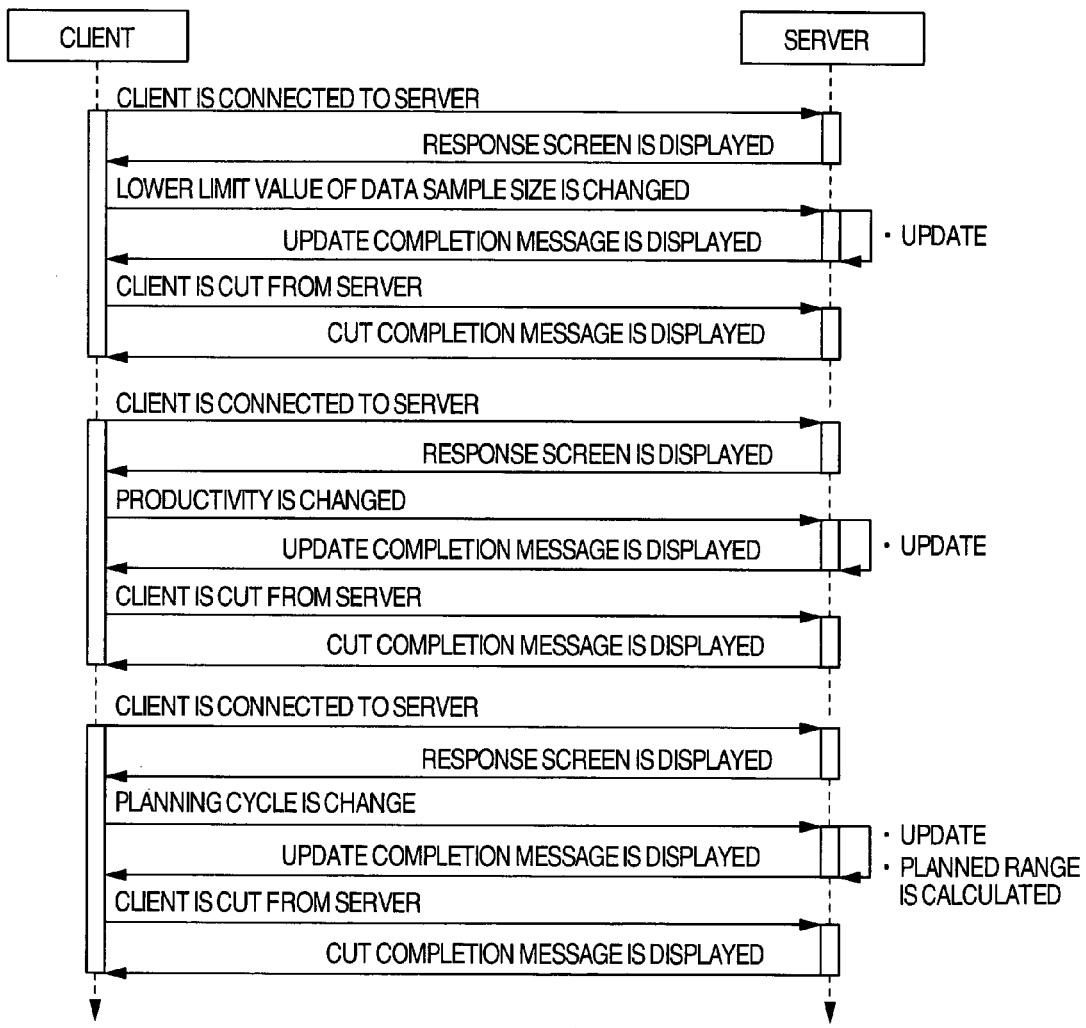
FIG. 5 is a diagram for indicating a flow operation as to a first reference updating process operation.
Figure 6:
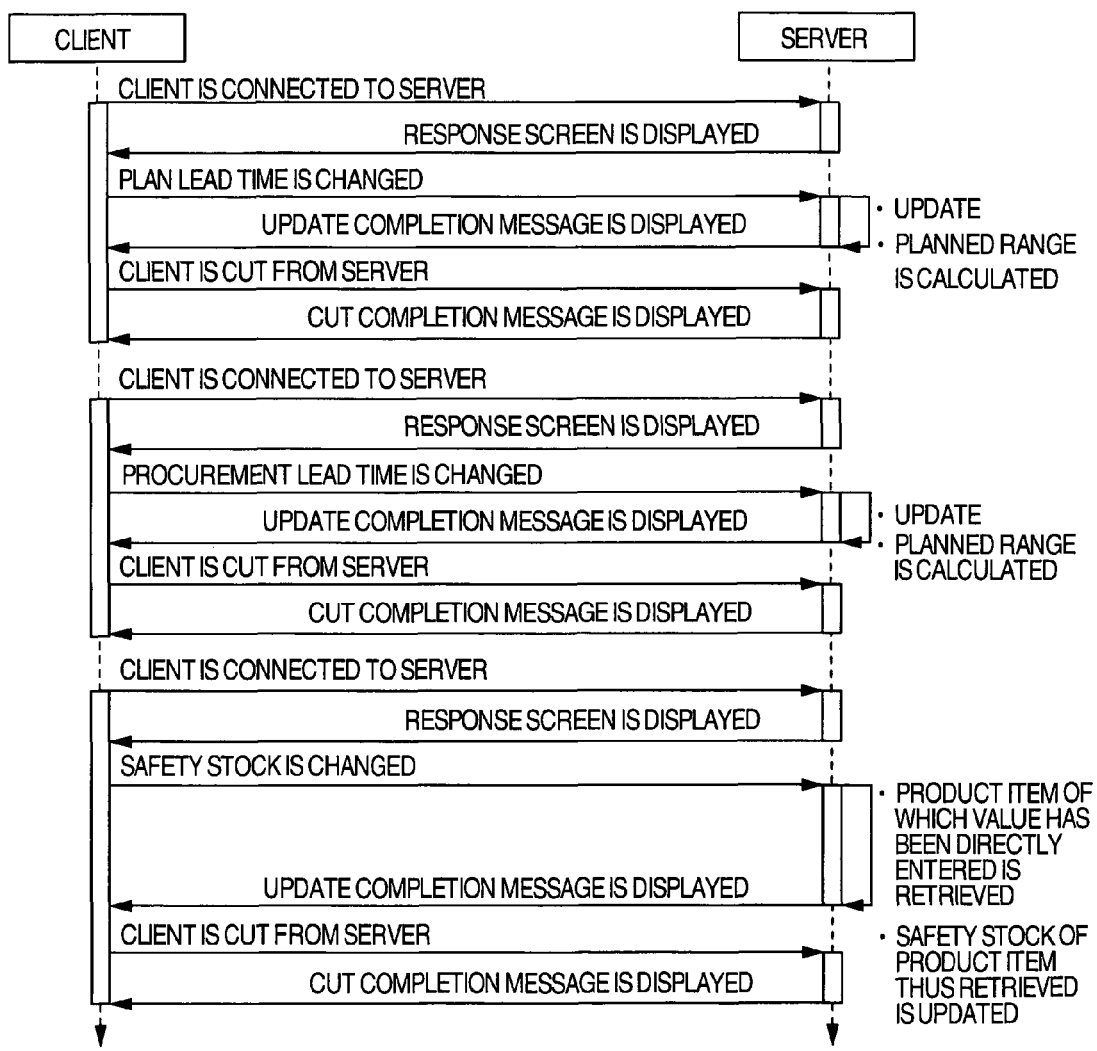
FIG. 6 is a diagram for representing another flow operation as to the first reference updating process operation.

Referring now to FIG. 5 and FIG. 6, a description is made of such a process operation used to update reference setting operation executed in such a case that the reference updating button-1 0206 of FIG. 2 is selected. A process operation shown in FIG. 6 corresponds to a process operation continued to the process operation of FIG. 5.

As indicated in FIG. 5 and FIG. 6, in the updating process operation for setting the reference value, a user is firstly connected to a server, and then, the server displays a response screen. When the user updates, for example, the planning cycle and registers the updated planning cycle, a registration completion message is displayed on the client machine on the side of the server. In addition to the planning cycle, as to updating process operations of the planning lead time, the procurement lead time, the lower value of the data sample size, the manufacturing capability, and the safety stock, when the user similarly updates reference setting values and registers the updated reference setting values, the server executes update processing operations. When the updating process operation is completed, the server displays a completion message on the display of the client. When the registering process operation is completed, the server performs a cutting process operation, and then displays a cutting completion message on the display of the client.

(3.4) Updating Process Operation-2 of Reference Setting Value

Figure 7:
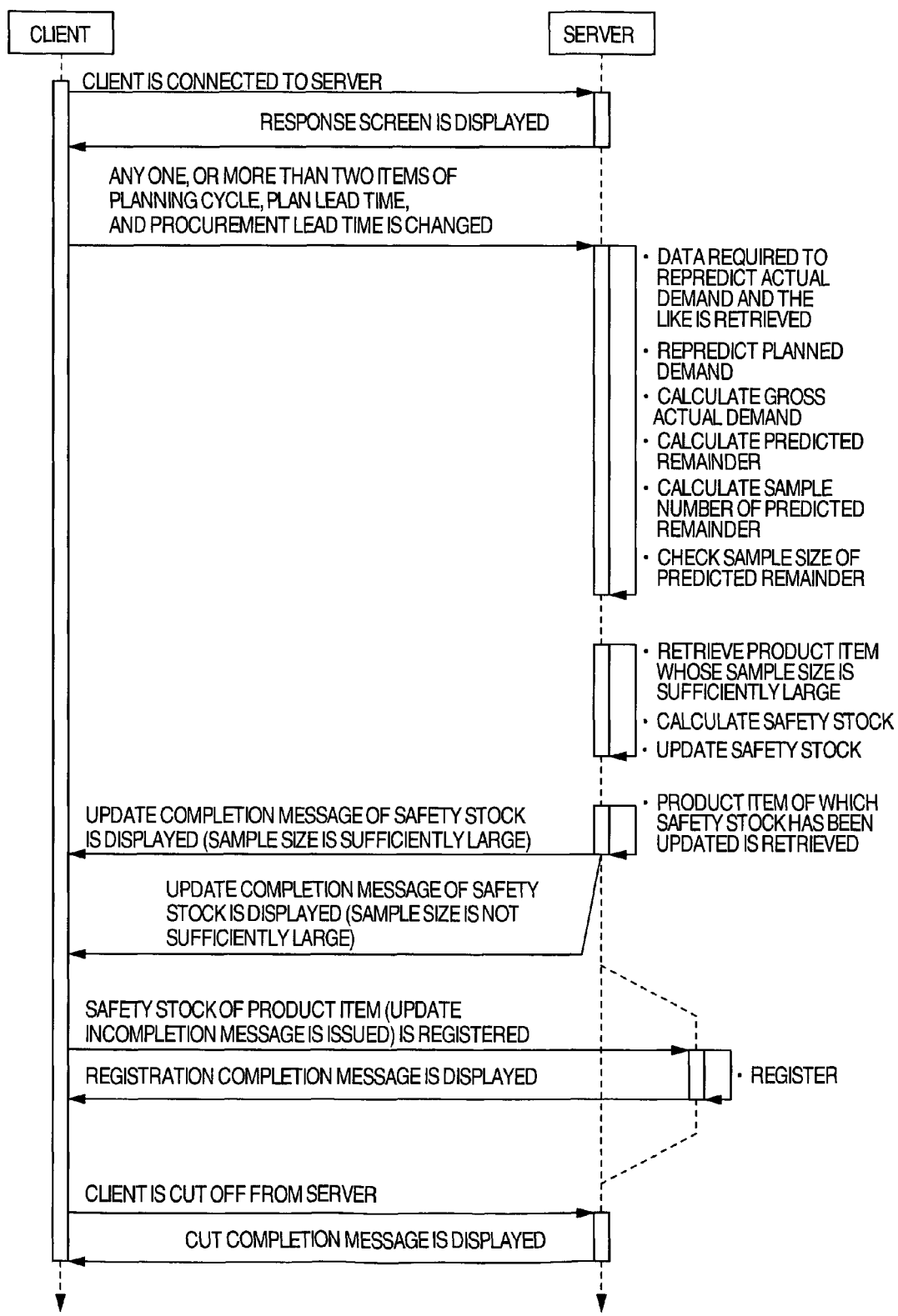
FIG. 7 is a diagram for indicating a flow operation as to a second reference updating process operation.
Figure 8:
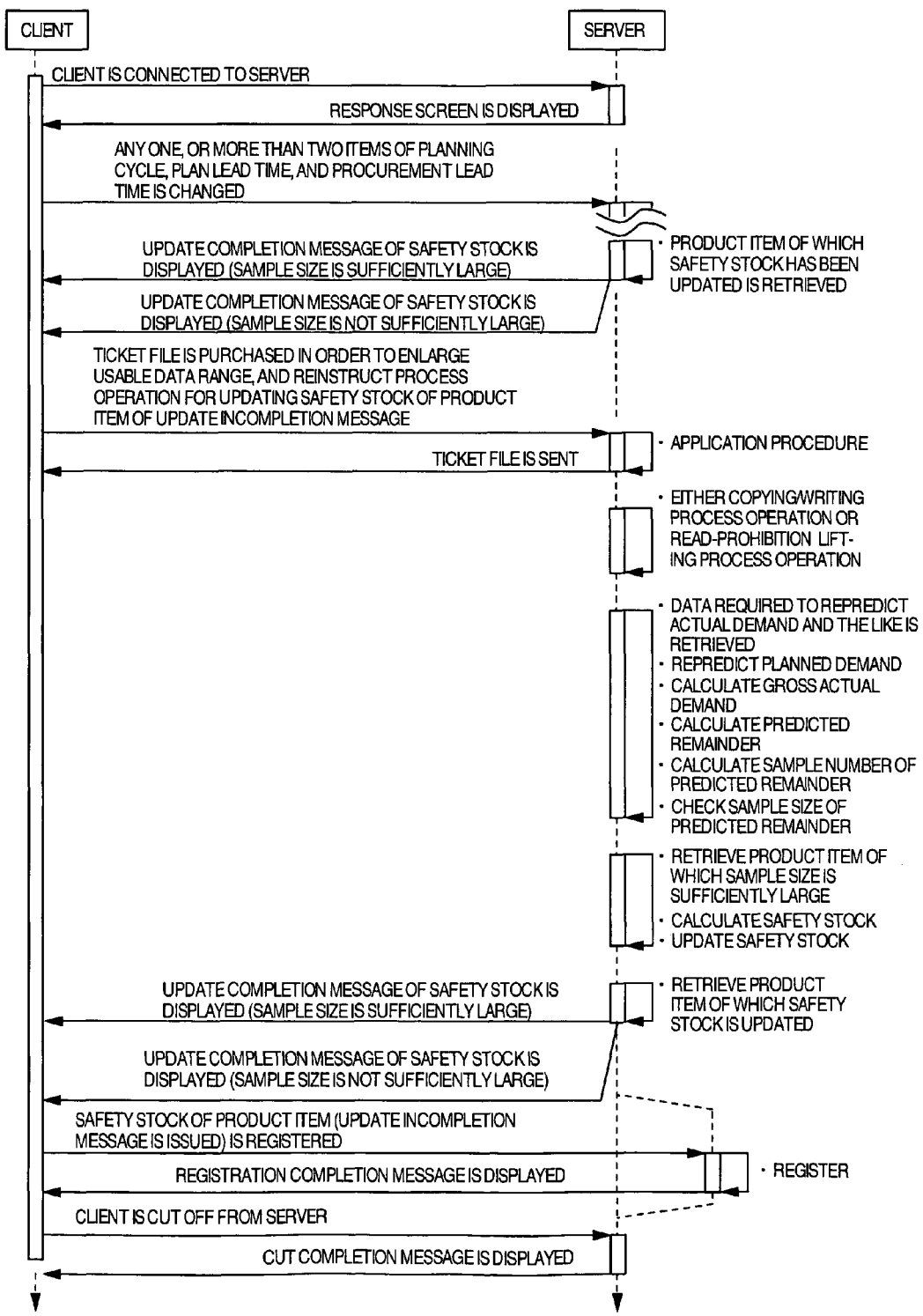
FIG. 8 is a diagram for representing another flow operation as to the second reference updating process operation.

Referring now to FIG. 7 and FIG. 8, a description is made of such a process operation used to update reference setting operation executed in such a case that the reference updating button-2 0208 of FIG. 2 is selected.

FIG. 7 and FIG. 8 show any of process flow operations executed in the case that the reference updating button-2 is selected. A difference between both the process flow operations is not caused by reference updating process operations themselves, but caused by a difference in fee collecting methods in the case that executions are conceived. FIG. 7 is a flow sequence diagram for explaining the fee collecting method such as the product purchasing system explained in the conventional technique.

FIG. 8 is a flow sequence diagram for representing such a system for executing a fee collecting process operation in which a utilization range of the functions of the inventory control system is previously defined, and a server issues such a called "ticket file" having information related to this utilization range so as to perform the fee collecting process operation. The fee collecting method by using the ticket file will be explained in detail in an item of "(4) FEE COLLECTING METHOD OF INVENTORY CONTROL SYSTEM USING TICKET FILE" and the succeeding items.

First of all, the case as to the fee collecting method of FIG. 7 will now be explained.

A client is connected to a server, and the server causes the client to display a response screen. A user selects the reference updating-2 button 0208 of FIG. 2. In accordance with the reference screen supplied from the server side, the user changes any one, or more items as to a planning cycle, a plan lead time, and a procurement lead time. On the side of the server, necessary data is retrieved so as to execute a reprediction operation, and then, as actual demand is compared with a predicted demand in order to acquire a predicted remainder. In FIG. 7, as a result of totalized predicted remainders which are employed so as to calculate safety stock, with respect to such an article whose sample size is sufficiently large, safety stock of this article is calculated, and the former safety stock is updated, and then, an update completion message of the safety stock as to this article is displayed.

As to such an article whose sample size is insufficiently large, safety stock which has been set by the user is manually registered. When this manual registering operation of the safety stock is accomplished, a registration completion message is displayed on the side of the server. When the process operation is accomplished, a cutting operation is carried out from the server and then a cutting operation completion message is displayed.

Subsequently, a flow operation of an updating process in the case that the ticket file is used will now be explained with reference to FIG. 8.

In FIG. 8, first of all, when a user is connected to a server, the server displays a response screen. In accordance with the reference screen supplied from the server side, the user changes any one, or more items as to a planning cycle, a plan lead time, and a procurement lead time. On the side of the server, a calculating process operation as to safety stock is carried out. As to such an article whose sample size is sufficiently large and whose safety stock can be calculated, the safety stock thereof is updated, and then an update completion message is displayed on the server side. As to such an article whose sample size is insufficiently large, an update incompletion message is displayed on the server side. In such a case that there are many articles in which updating of safety stock thereof has not yet been accomplished, and these articles exceed the range where the safety stock can be manually entered as explained in the example of FIG. 7, the user enlarges the range of usable data in order to increase the sample size.

In this embodiment mode, a so-called "ticket file" is purchased so as to utilize the inventory control system, which will be later described in an explanation of a fee collecting process operation. In this ticket file, a range of data to which the user can refer when the inventory control system is utilized is designated. To this end, in the case that the user wants to enlarge a range of usable data in order to increase a sample size, the user is required to purchase a ticket file in which a use range of data has been enlarged. In response to a purchase request of such a ticket file issued from the client side, on the server side, an issuing procedure of the ticket file is carried out, and then, a ticket file in which the usable data range has been enlarged is transmitted.

While the user uses the newly purchased ticket file, the user again instructs an updating process operation of the safety stock. As a result of a second execution as to the safety stock updating process operation, such an article is displayed whose sample size may become sufficient and whose safety stock has been updated, and further, another article is displayed whose safety stock updating operation has not yet been accomplished. Alternatively, in such a case that a total number of articles whose safety stock updating operations have not yet been accomplished becomes small after the second executions of the updating process operations, the safety stock as to the remaining articles whose safety stock updating operations have not yet been completed may be manually updated. Alternatively, in such a case that articles whose safety stock updating operations have not yet been completed are large, the user may purchase such a ticket in which a usable data range has been enlarged so as to again perform an updating process operation as to safety stock.

(3.5) Updating Process Operation of Safety Stock

Next, a description will now be made of updating process operations as to safety stock in conjunction with changes in setting of reference values.

In this embodiment, there are three sorts of updating process operations as to safety stock. One safety stock updating process operation among them is such a process operation capable of automatically updating safety stock within the normal business. Another safety stock updating process operation corresponds to such a process operation executed in the case that the reference updating-1 button 0206 of FIG. 2 is selected. A final safety stock updating process operation corresponds to such a process operation executed in the case that the reference updating-2 button 0208 of FIG. 2 is selected. To explain these three safety stock updating process operations, in the beginning, both a calculation formula and a calculation sequence as to safety stock will now be described.

(3.5.1) Calculation Formula and Calculation Sequence of Safety Stock

Both the calculation formula and the calculation sequence of the safety stock will now be described with reference to FIG. 10 and FIG. 11.

Figure 10:
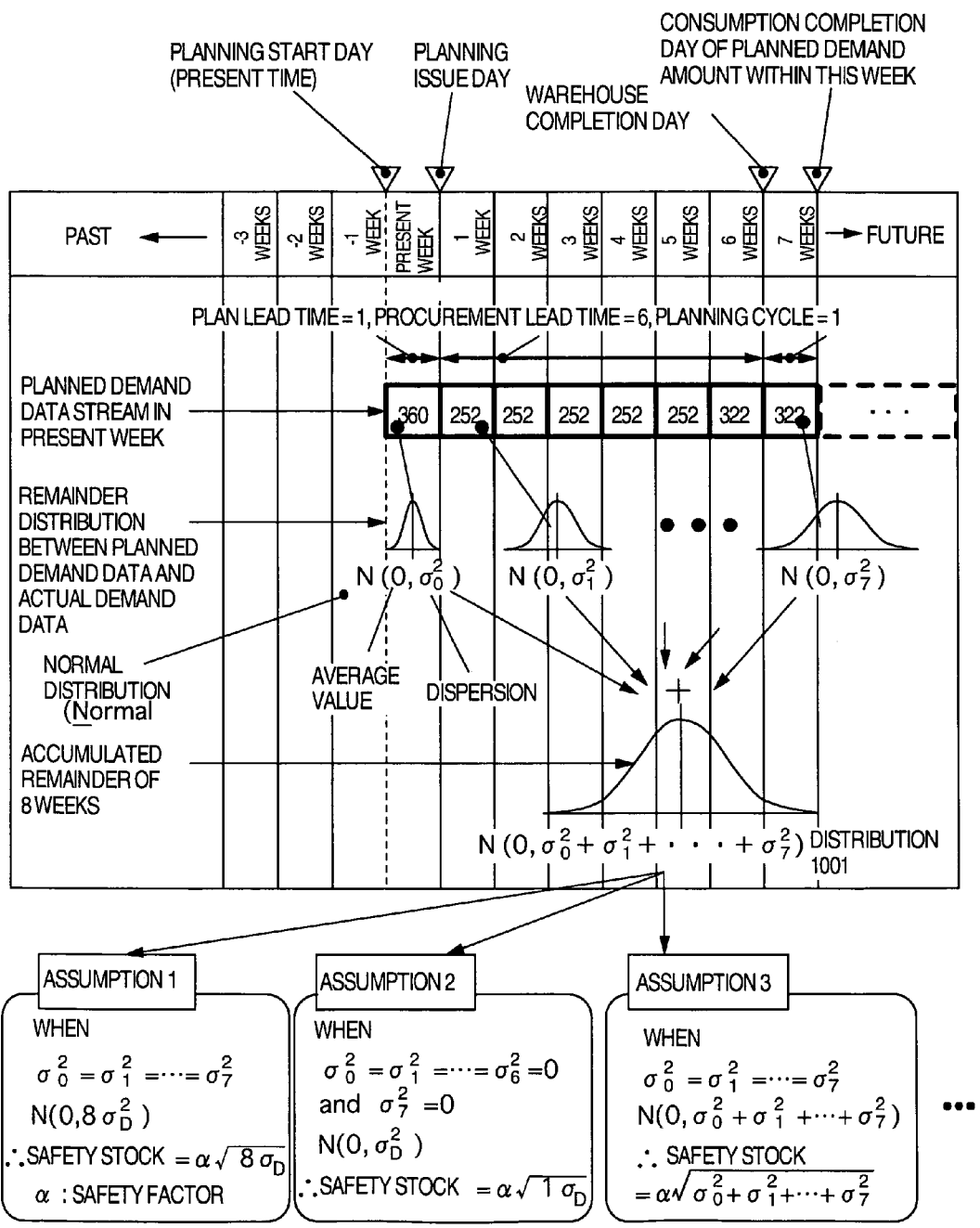
FIG. 10 is an explanatory diagram for explaining a calculation formula as to safety stock.

FIG. 10 is a diagram for schematically representing an example as to the calculation formula of the safety stock. FIG. 11 is a diagram for schematically showing an example of the calculation sequence of the safety stock.

In FIG. 10, such a calculation example is shown in which a plan lead time (scheme lead time) is defined as one (1) week; a procurement lead time is defined as six (6) weeks; and a planning cycle is defined as one (1) week. It is now assumed that a head (top) of this present week shown in FIG. 10 corresponds to a starting date of planning at the present time. An issuing date of the planning becomes a head of a first week, and a warehousing completion date corresponds to an end of a sixth week. Planned demand data in the present (relevant) week becomes 360; planned demand data from the first week up to a fifth week becomes 252; planned demand data in a sixth week becomes 322; and planned demand data in a seventh week becomes 322.

It should be understood that in each of the above-described weeks, at a stage when an actual demand can be obtained, this actual demand is compared with a planned demand to calculate a predicted remainder, and then a distribution of these predicted remainders is imaged to be represented as a graph of normal distributions in a middle column of this drawing. Dispersion values "σ" are different from each other every week under such a condition that a dispersion value of the first week is "$\sigma_0$" and a dispersion value of the second week is "$\sigma_1$." An accumulated remainder distribution within the plan range becomes such a distribution 1001 as indicated in a lower column of the drawing. In the case that all of the dispersion values of the respective weeks are assumed to be identical to each other, both an accumulated remainder distribution and safety stock for eight (8) weeks are indicated in an "assumption 1" of FIG. 10. This becomes equivalent to the calculation formula indicated in the conventional technique.

Also, when it is so assumed that each of dispersion values is equal to 0 (zero) from the present (relevant) week up to the sixth week and is not equal to 0 (zero) in the seventh week, both an accumulated remainder distribution and safety stock are indicated in an "assumption 2" in FIG. 10. This assumption 2 corresponds to such an assumption case that demands up to the sixth week have been secured. In such a case that the respective dispersion values are not identical to each other, but also are not equal to zero, both an accumulated remainder distribution and safety stock may be obtained by a formula represented in an assumption 3. Although the calculation formula of this assumption 3 becomes complex, this calculation formula corresponds to a general-purpose formula which involves the assumption 1 and the assumption 2.

Figure 11:
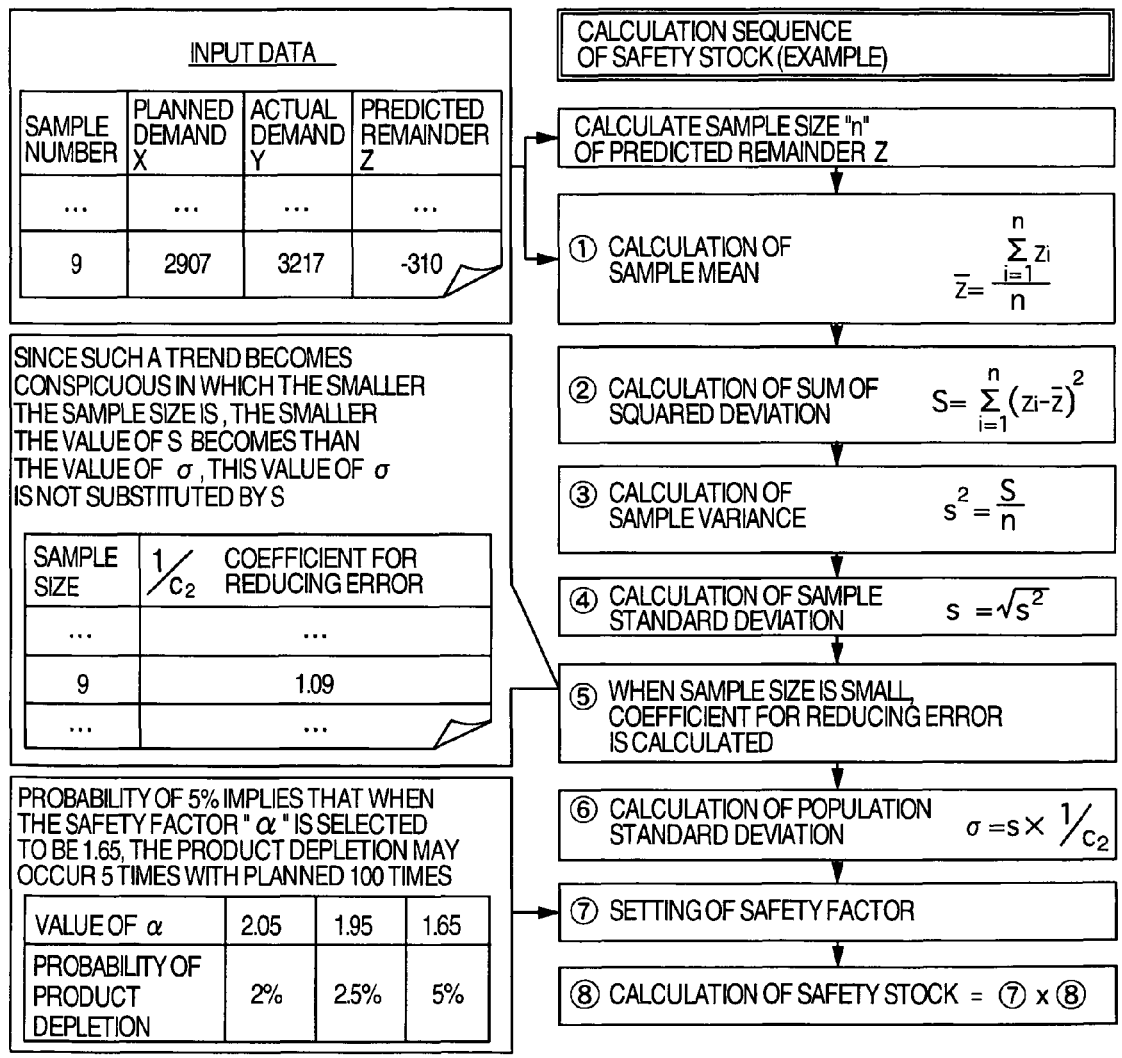
FIG. 11 is an explanatory diagram for explaining an example of a calculation sequence as to safety stock.

A concrete as well as general-purpose calculation sequence with respect to safety stock is given, for example, as a calculation sequence shown in FIG. 11.

(Sequence 1): A calculation is made of a sample size "n" of a predicted remainder "Z" which is obtained by accumulating actual demands and by comparing the accumulated actual demand with a planned demand.

(Sequence 2): A calculation is made of a sample mean as to samples.

(Sequence 3): A calculation is made of a sum of squared deviation.

(Sequence 4): A calculation is made of sample variance.

(Sequence 5): A calculation is made of sample standard deviation.

(Sequence 6): In the case that a sample size is small, a watering coefficient (that is, a coefficient which reduces the error generated when the number of samples is not enough) is calculated.

(Sequence 7): Population standard deviation is calculated.

(Sequence 8): A safety factor is set.

(Sequence 9): Safety stock is calculated.

The reason why the watering coefficient is calculated in the above-described sequence 6 is given as follows: That is, since in the case that a sample size is small, such a trend becomes conspicuous in which a sum of squared deviation "S" becomes smaller than population standard deviation "σ", it is better to substitute the population standard deviation "σ" by the sum of squared deviation "S." Also, in the sequence 8, when a safety factor "σ" is selected to be 1.65, probability of product depletion is equal to 5%. This probability implies that while plannings are made up 100 times, product depletion may occur approximately 5 times. Also, the safety stock may be calculated by multiplying the population standard deviation calculated in the sequence 7 by the safety factor set in the sequence 8. This multiplication formula is equivalent to a calculation formula as to safety stock indicated in the assumption 3 of FIG. 10.

Next, the updating process operations of the safety stock will now be explained.

(3.5.2) Updating Process Operation-1 of Safety Stock

Figure 12:
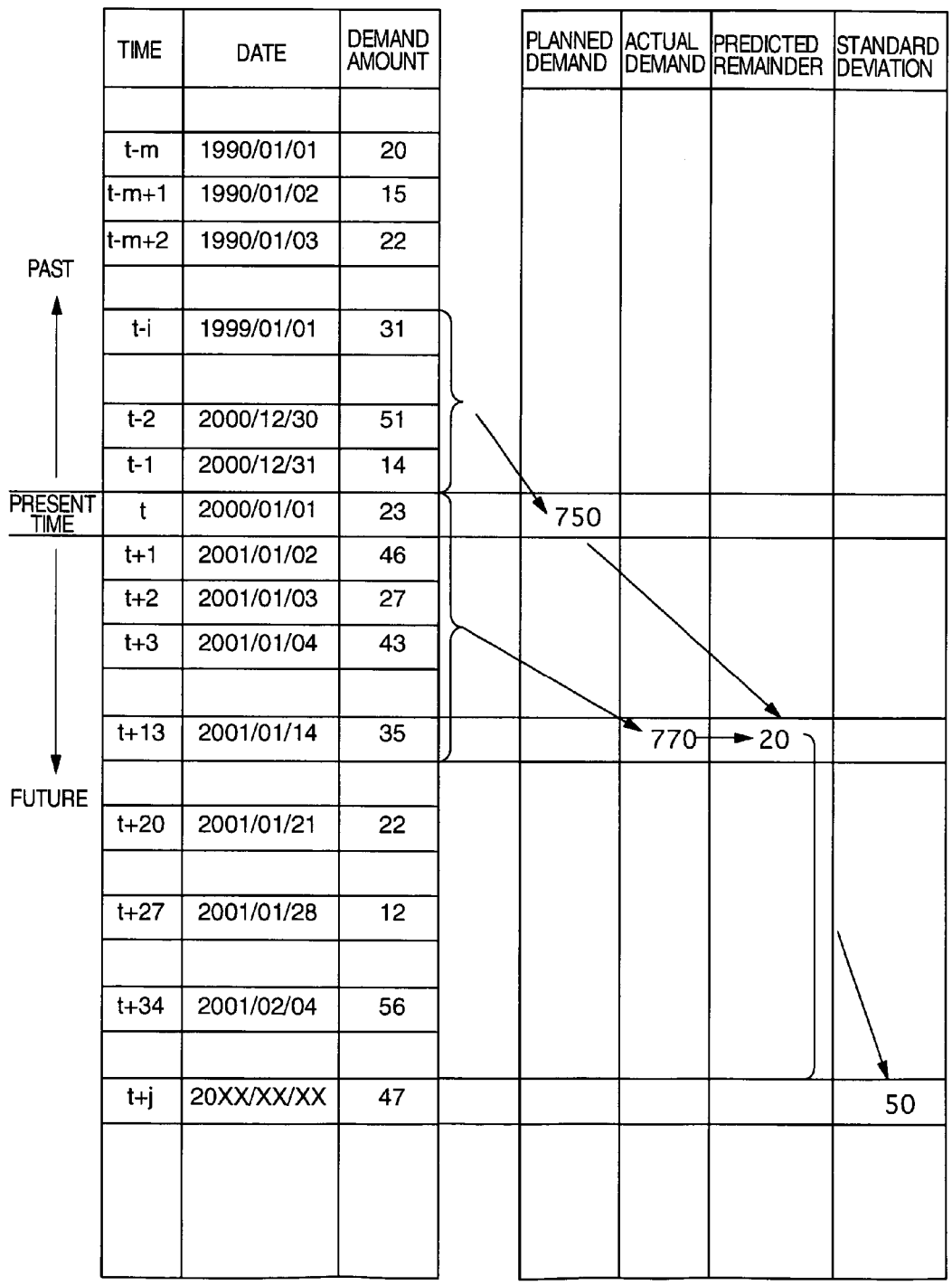
FIG. 12 is a diagram for indicating a range of data employed in a calculating process operation of safety stock.

An updating process operation-1 of safety stock will now be explained with reference to FIG. 12 and FIG. 14. This updating process operation-1 of the safety stock corresponds to a process operation for automatically updating safety stock during the normal business.

On the side of the server, a demand plan processing operation is firstly carried out so as to calculate a planned demand. In an example of FIG. 12, the planned demand is equal to 750. Then, a day-to-day demand acquiring process operation, a day-to-day production amount acquiring process operation, and also, a day-end inventory amount calculating process operation are carried out in order to calculate demand information, a production amount, and an inventory amount every day. Then, these calculated data are totalized. In FIG. 12, such an example is shown in which these data are totalized from the present time instant "t" up to another time instant "t+13." As a result of totalizing data which have been stored from the present time instant "t" up to the time instant "t+13", it is so assumed that an actual demand was 770. In the case of FIG. 12, since the previously-calculated planned demand was assumed to be equal to 750, a predicted remainder between the actual demand of 770 and the planned demand of 750 becomes 20. A plurality of predicted remainders, the total number of which is equal to a total size of required samples, are calculated in such a manner, and then, standard deviation of the calculated predicted remainders is calculated. FIG. 12 represents such a case that the standard deviation of these calculated predicted remainders was equal to 50.

Next, a description is made of a process, flow-operation defined by that an initial registered value of safety stock is automatically updated to become a new updated value.

First, in a reference setting phase, a reference setting process operation is commenced so as to set various sorts of reference items (step S1401), and then, a set content such as a procurement lead time is stored in a database (step S1402), and then, this reference setting process operation is completed. Also, as to safety stock, a reference setting process operation is separately initiated so as to commence this reference setting process operation, and a reference item is set (step S1403), and then a set content is stored in a database of the safety stock (step S1404), and thereafter, this reference setting process operation is stored (step S1404). Thus, this reference setting process operation is ended.

In a normal business phase based upon the reference setting operation, when a process operation is carried out, a demand plan processing operation is firstly carried out. Then, a supply plan processing operation is carried out based upon the safety stock data of the reference setting operation. Subsequently, a progress management processing operation is carried out so as to execute an inventory analysis process operation based upon an actual demand. In the demand plan processing operation, the supply plan processing operation, and the inventory analysis processing operation, the data which have been set in the reference setting phase are considered. Until the necessary number of samples, the process operation is again returned to the start 1, and then, the respective process operations such as the demand process operation, the supply plan process operation, and the progress management are continuously carried out. After the data as to the necessary sizes of samples have been collected, such a safety stock can be obtained for the first time. Then, when the safety stock is updated, process operations are repeatedly carried out in a similar manner based upon this updated safety stock as to the next plan.

Figure 14:
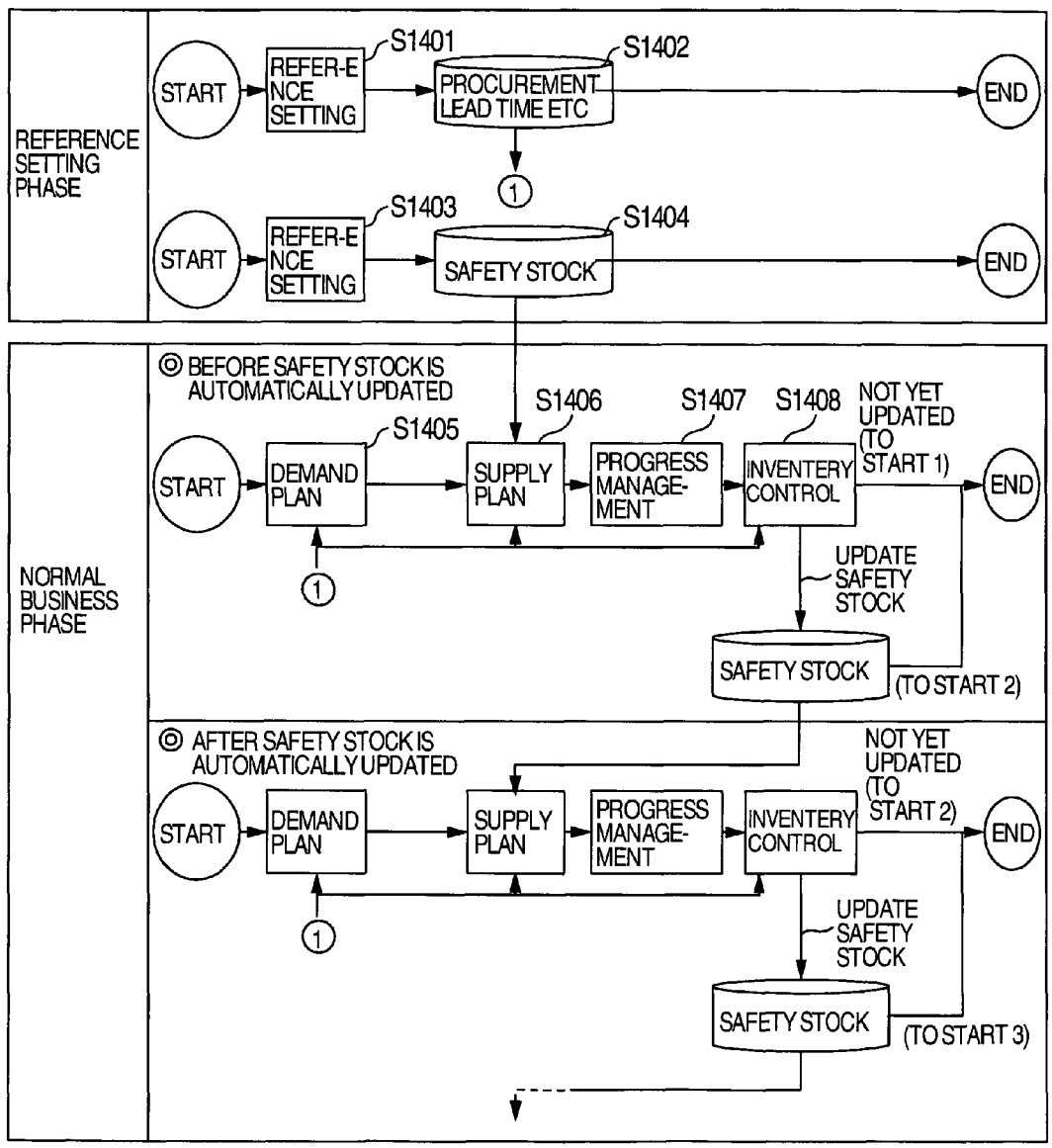
FIG. 14 is an explanatory diagram for explaining an updating process operation of safety stock.

In FIG. 14, the process operation must wait such a condition that the data as to the necessary sizes of the samples for calculating the safety stock have been stored until the safety stock is updated. For instance, such a long time period as several weeks is required. In other words, there is a large time lag until the safety stock is updated. Also, when the set value such as the procurement lead time is changed in a half way of the process operation, the predicted remainders which have been so far acquired become invalid, so that such a safety stock to which this change may be reflected cannot be calculated.

(3.5.3) Updating Process Operation-2 of Safety Stock

Figure 15:
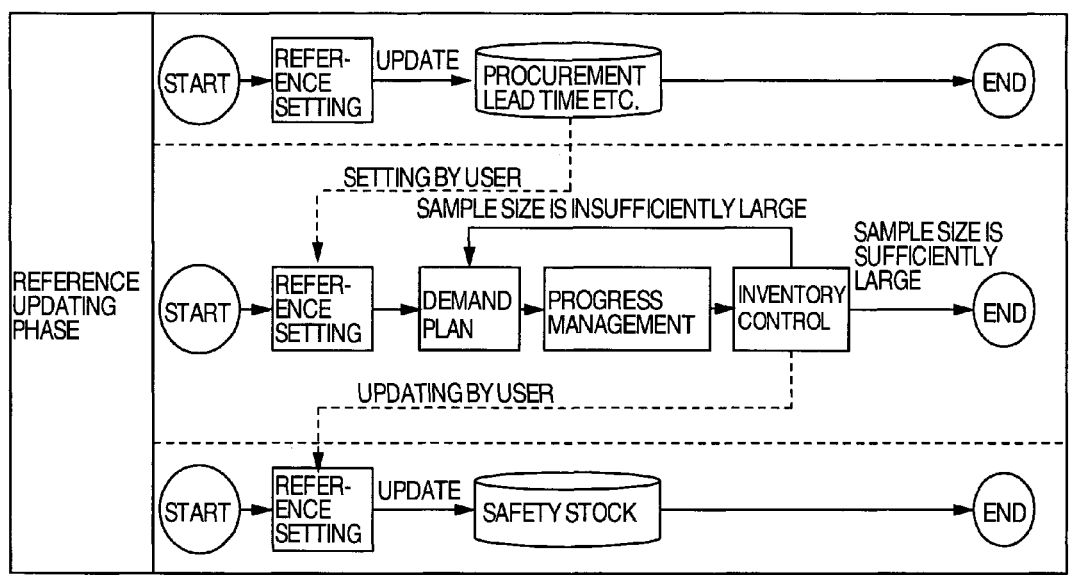
FIG. 15 is an explanatory diagram for explaining an updating process operation of safety stock in conjunction with a change of a reference setting value.

Referring now to FIG. 15, an updating process operation-2 of safety stock will be explained. This safety stock updating process operation-2 corresponds to such a process operation that the user manually updates safety stock in connection with a change of setting values such as a procurement lead time.

As shown in FIG. 15, in this case, this safety stock updating process operation is constituted by three stages. First, the updating process operation is commenced; a reference setting process operation is carried out; a procurement lead time and the like are changed; and then, this updating process operation is accomplished (namely, first stage). Next, the updating process operation is commenced; a demand plan, a progress management, and an inventory analysis are updated until sample sizes become sufficiently large; and then, when the sample sizes become sufficiently large, this updating process operation is ended (namely, second stage). It should be noted that the data ranges which are used in the respective updating process operations such as the demand plan are different from such data ranges which are used under normal condition, and thus, data which were acquired in the past are employed. In other words, the original demand plan processing operation corresponds to such a processing operation capable of predicting a future demand at the present time. However, in this case, the demand plan processing operation corresponds to such a processing operation capable of predicting a demand up to the past time from the present time. Both the progress management updating process operation and the inventory analysis updating process operation are carried out in a similar manner. Subsequently, the updating process operation is commenced; the reference setting process operation is carried out so as to update the safety stock; and then, the updating process operation is accomplished (namely, third stage). In the updating process operation-2 of the safety stock, since updating of the set value such as the procurement lead time in the first stage is not reflected to the process operations in the second stage and the third stage, the user must manually sets the changed content when the necessary process operation at the respective stages is carried out. In other words, in such a case that the procurement lead time and the like are tried to be changed, the user must perform the data changing operations three times at the respective stages, namely at the first stage, at the second stage, and at the third stage.

(3.5.4) Updating Process Operation-3 of Safety Stock

Figure 16:
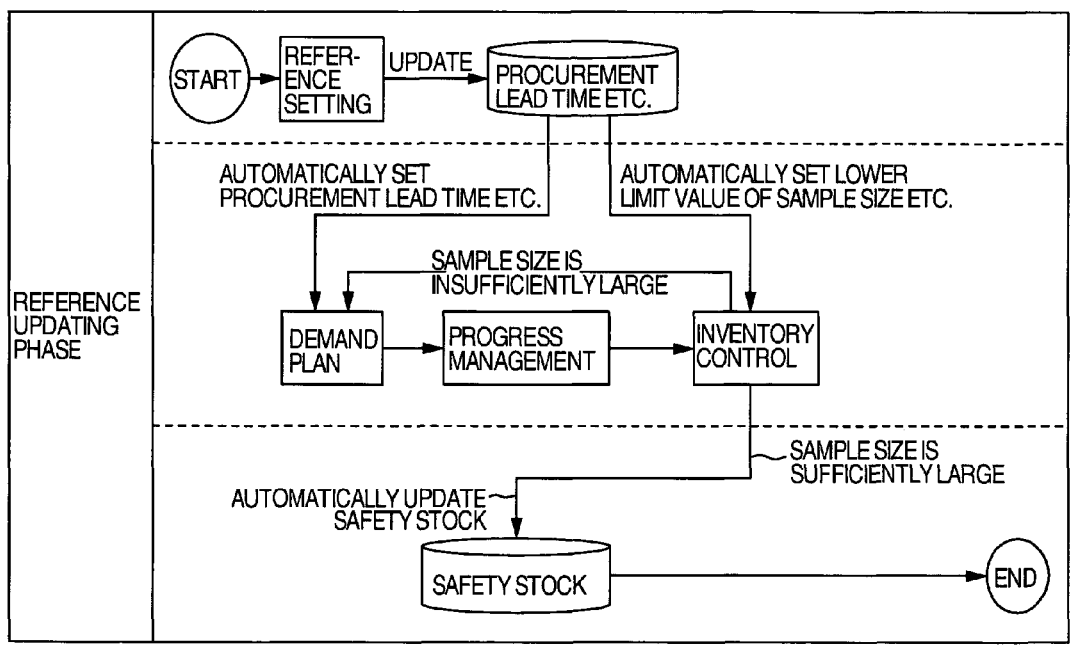
FIG. 16 is an explanatory diagram for explaining another updating process operation of safety stock in conjunction with a change of a reference setting value.

Referring now to FIG. 13 and FIG. 16, an updating process operation-3 of safety stock will be explained. This safety stock updating process operation-3 corresponds to such a process operation that safety stock is automatically updated in connection with a change of setting values such as a procurement lead time.

In FIG. 13, both timing at which each sort of calculation functions is operated and a data area are changed. In this calculation method of the safety stock, while a data area is defined by tracing past data, a demand plan is made as to this data area, and this demand plan is compared with an actual demand so as to obtain a predicted remainder. Then, standard deviation of this predicted remainder is calculated so as to calculate safety stock at the present time instant. The standard deviation of this calculation result implies the standard deviation at the present time instant. Since the data which is employed so as to calculate the safety stock corresponds to the past data, the safety stock can be calculated without waiting for such a condition that the time period of the plan range has elapsed, and also, the samples are stored.

In the example of FIG. 13, in order to calculate the safety stock at the present time instant "t", a calculation is made of a predicted remainder of 20 between a planned demand of 750 and an actual demand of 770, while the planned demand of 750 is calculated based upon data acquired from the past time up to a time instant "t−m+2", and the actual demand is calculated based upon data acquired from this time instant "t−m+2" up to another time instant "t−i." Then, a plurality of predicted remainders equal to the necessary sample sizes are calculated based upon data up to a time instant "t−1" so as to calculate standard deviation of 50 at the present time instant "t." As a consequence, the safety stock at the present time instant "t" can be calculated. In accordance with the method capable of calculating the safety stock at the present time instant, in such a case that the procurement lead time and the like are changed, this changed content is automatically reflected to the calculation when the updating process operation is performed one time, so that the calculation is automatically performed until the safety stock is calculated.

FIG. 16 indicates a process flow operation executed in such a case that safety stock is updated in connection with a change in procurement lead time and the like. In a reference updating phase of the safety stock calculating sequence 3, the updating process operation is commenced; a setting process operation of a reference item is carried out; and then, the procurement lead time and the like are updated. It is sufficient to carry out this updating operation only one time. Then, while the data are utilized which have already been acquired from the past time up to the present time instant, the demand plan updating process operation, the progress management updating process operation, and also the inventory analysis updating process operation are carried out based upon this updated data. When the data are acquired whose total number is equal to the necessary sample sizes, safety stock is calculated, and then, this updating process operation is ended.

In this calculating process operation, the calculating process operation may be constituted by a single flow operation until the safety stock is calculated by merely changing the reference setting value only one time. In other words, the process flow operation is not segmented, although the process flow operation of the above-explained calculation sequence 2 is segmented. Also, the calculation result to which the change in the reference setting value has been reflected can be immediately obtained without any time lag. That is to say, in accordance with this calculation sequence 3, such a fact never occurs. Namely, when setting value such as the procurement lead time is changed in a half way as explained in the calculation sequence 1, the predicted remainders which have been so far calculated to be acquired may become invalid, so that such a safety stock to which the changed setting value has been reflected cannot be calculated.

(4) Fee Collecting Method of Inventory Control System Using Ticket File (4.1) Outline In this embodiment, an ASP (Application Service Provider) side which provides an inventory control program issues an electronic "ticket file" via a network, while this electronic ticket file determines a use range and a use content with respect to a client who may use this inventory control program. Since a fee collecting process operation is carried out at such a time instant when a client purchases this electronic ticket file, a fee may be collected before this client utilizes a service. The client may use the functions of the inventory control system based upon the content of the purchased ticket file and a restricted range which is determined by this ticket file. In this embodiment mode, two examples are indicated as restriction systems given by a purchased ticket file.

One restriction system corresponds to such a method that a data access control may be realized by duplicating data within a range, which may be used from a data-source storage unit 1704 to a data-destination storage unit 1705 (restriction system 1). In other words, in this restriction system, the inventory control system does not use the data stored in the data-source storage unit 1704, but uses the data stored in the data-destination storage unit 1705. It should be understood that this embodiment explains such a structure that the data-source storage unit 1704 is provided in the auxiliary storage apparatus 0104 of the server machine 0109 of FIG. 1. However, the data-source storage unit 1704 may be alternatively employed in the auxiliary storage apparatus 0108 of the client machine on the side of the client, or may be alternatively employed in the auxiliary storage apparatus 0104 of the server machine. For example, in such a case that data which have been stored by a client enterprise are employed in this inventory control system, this data-source storage unit 1704 may be provided in a client machine, whereas in such a case that knowhow data and the like are employed, which are commonly used in industries, this data-source storage unit 1704 may be provided in a server machine.

Another restriction system corresponds to such a method that an access control to the data stored in the data-source storage unit 1704 is carried out (restriction system 2), which is completely different from the above-described restriction system 1 in which the usable data are separated to be stored based upon the content of the ticket file.

Next, a description will now be made of differences in the respective restriction systems as to a purchase of a ticket file, a use of this ticket file, and an invalidation of this ticket file.

(4.2) Purchase of Ticket File

Figure 17A:
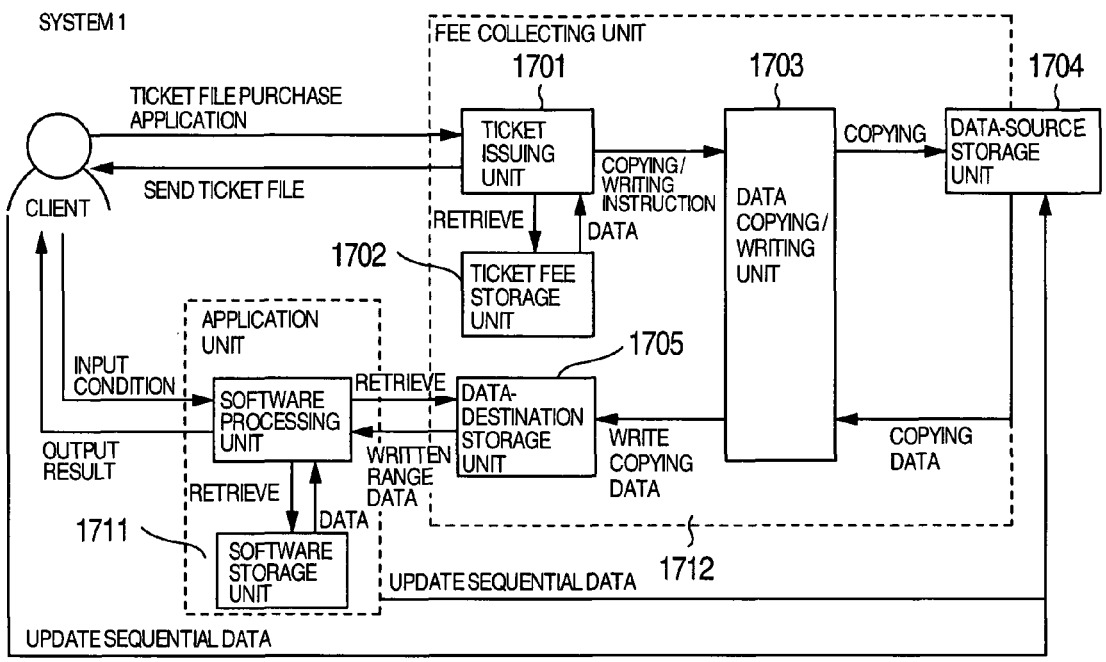
FIGS. 17A and 17B are explanatory diagrams for explaining a purchasing process operation of a ticket file.
Figure 17B:
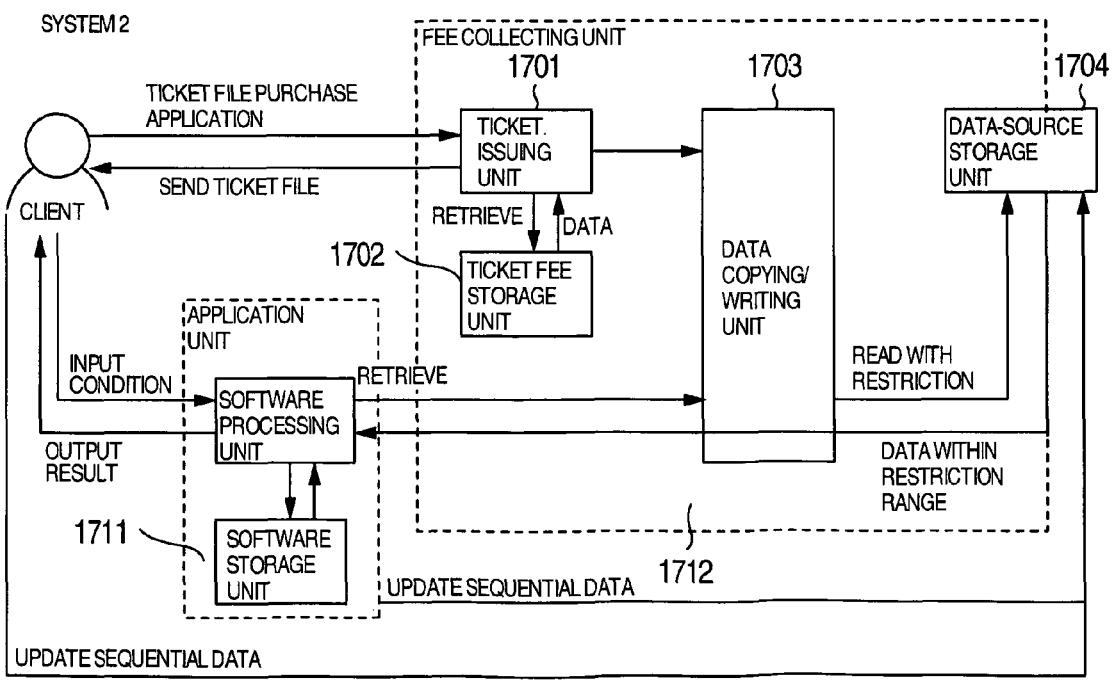

First of all, a purchase of a ticket file will now be explained with reference to FIG. 17. FIG. 17 is an explanatory diagram for explaining a data flow in the purchase of such a ticket file. That is, FIG. 17A is an explanatory diagram as to the restriction system 1, and FIG. 17B is an explanatory diagram as to the restriction system 2.

(4.2.1) In Case of Restriction System 1

First, a client accesses a fee collecting unit 1712 of the inventory control system via a network, or the like, and transmits such information as to a function which is wanted to be used by this client, and also, information such as a sort of used data and a data amount so as to issue an application of a purchase of a ticket file.

A ticket issuing unit 1701 which has received the ticket file purchasing application issued from the client issues a ticket file based upon the ticket file purchasing application, and then, transmits this issued ticket file via the network to the client. In this case, the ticket issuing unit 1701 retrieves a fee database of a ticket fee storage unit 1702, and derives fee data from fee system data stored in this ticket fee storage unit 1702 so as to execute a fee collecting process operation. Also, the ticket file issuing unit 1701 instructs a data copying/writing unit 1703 to copy (duplicate)/write data based upon the ticket file purchasing application accepted from the client. Upon receipt of this instruction, the data copying/writing unit 1703 copies the data of the data-source storage unit 1704 based upon the information as to the use function, and also as to the sort/amount of the use data, which are contained in the ticket file purchasing application, and then, writes the copied data into the data-destination storage unit 1705. It should be noted that both the data copying operation and the writing operation of the copied data may be carried out when the ticket file is issued, or alternatively, may be carried out when the inventory control system is utilized by employing the ticket file purchased by the client. In such a case that the data is copied/written when the inventory control system is utilized, it is so conceivable that the reception of the ticket file from the client may be employed as the instruction of the copying/writing operations.

FIG. 22 indicates an example of contents of a ticket file. This ticket file is constituted by a ticket file number specific to the own ticket file, the respective items which are set based upon ticket file purchasing information requested from a client, a total fee which is calculated based upon the content of this ticket file purchasing information, and a detailed content thereof.

As previously explained, the fee collection may-be determined based upon the data sort and the data amount stored in the data-destination storage unit 1705. The fee collecting process operation is carried out when the ticket file is issued.

(4.2.2) In Case of Restriction System 2

First, a client accesses a fee collecting unit 1712 of the inventory control system via a network, or the like, and issues an application of a purchase of a ticket file similar to the restriction system 1. The fee collecting unit 1712 which has received the ticket file purchasing application issued for the client issues as electronic ticket file similar to the restriction system 1 and then, transmits this issued ticket file via the network to the client machine. In this restriction system 2, the ticket issuing unit 1701 issues a read-prohibition lifting instruction with respect to a data read control unit 1706. In this case, this read-prohibition lifting instruction implies such an instruction that the client can access the data-source storage unit 1704 within the ranges of the data sort and of the data amount indicated in the ticket file. Upon receipt of this read-prohibition lifting instruction, the data read control unit 1706 controls the data access operation under such a control condition as the time duration and the allowable times of data changing operation, which are indicated in the ticket file. Also, in this restriction system 2, timing at which the read-prohibition lifting instruction is issued is not limited to such a timing when the ticket file is issued, but also may be such a timing when the client uses the inventory control system by employing the ticket file. Also, such a technical point that the ticket file may be employed as the read-prohibition lifting instruction is similar to that of the restriction system 1.

Similar to the restriction system 1, the fee collection may be determined based upon the data sort and the data amount, which are allocated to be accessed. The fee collecting process operation is also carried out when the ticket file is issued.

(4.3) Use of Ticket File

Subsequently, a use of the ticket file will now be explained with reference to FIG. 18 and FIG. 19. It should also be noted that even in such a case that just after a ticket file is purchased, a function of the inventory control system is utilized by employing this purchased ticket file, a process operation similar to the below-mentioned process operation is carried out subsequent to a purchasing process operation of the ticket file.

Figure 18:
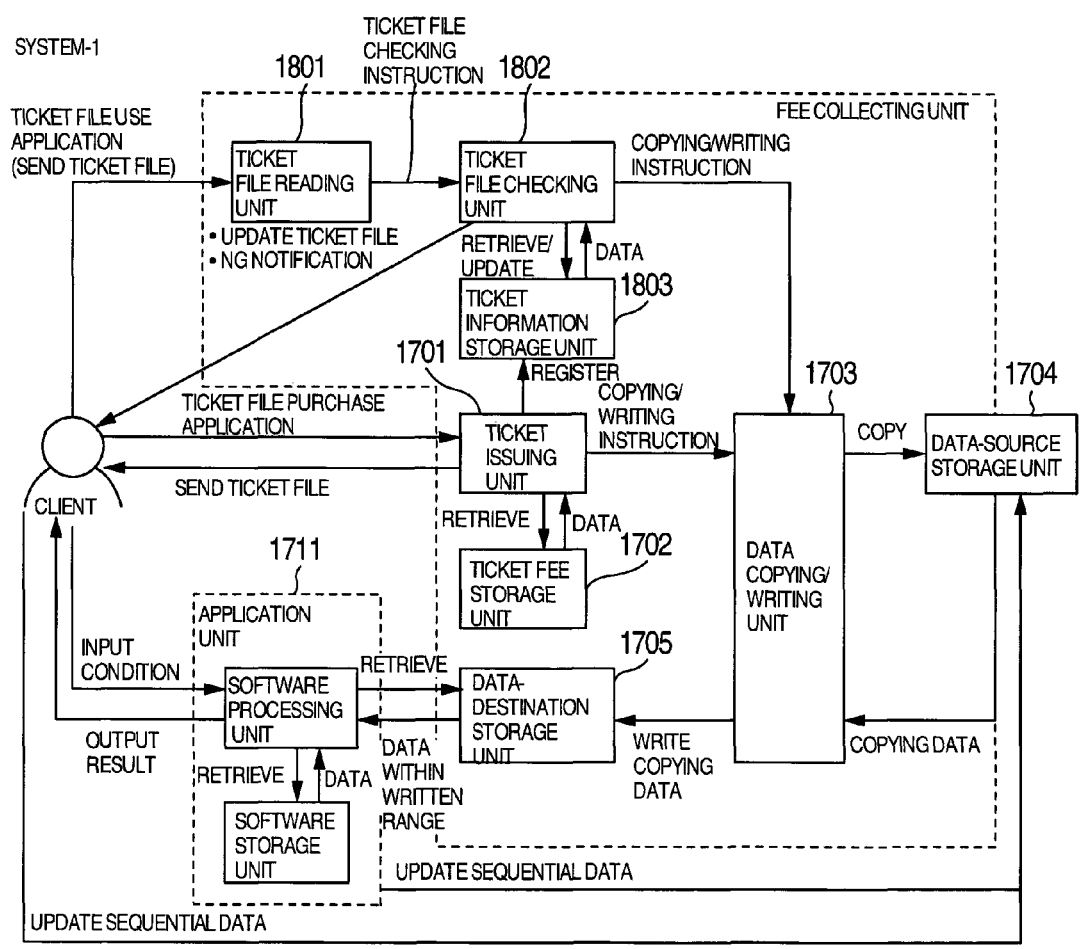
FIG. 18 is an explanatory diagram for explaining a process operation executed when the ticket file is used.
Figure 19:
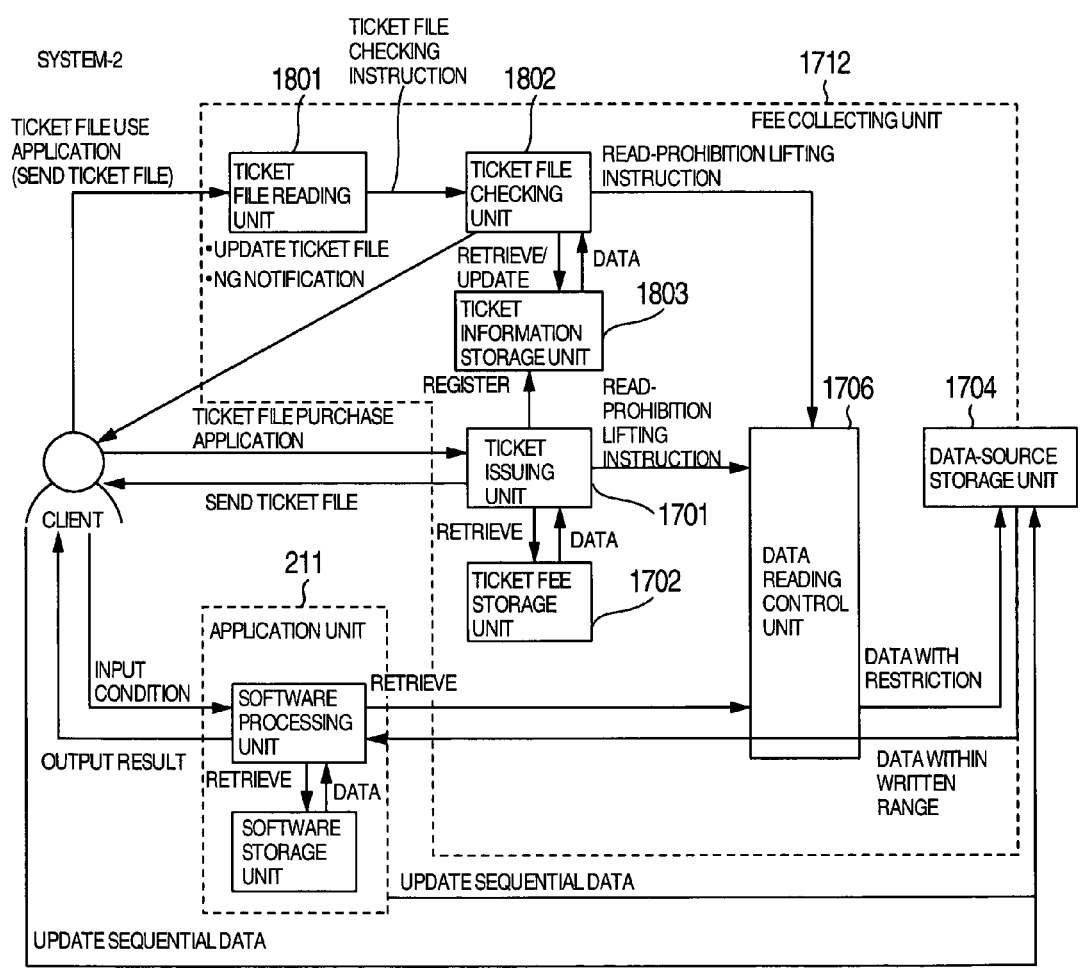
FIG. 19 is an explanatory diagram for explaining another process operation executed when the ticket file is used.

FIG. 18 is an explanatory diagram for explaining the utilization of the function of the inventory control system by way of the ticket file in the case of an execution system 1. FIG. 19 is an explanatory diagram for explaining the utilization of the function of the inventory control system by way of the ticket file in the case of an execution system 2. It should also be noted that the same structural names shown in FIG. 17 are employed as these for denoting the same, or similar structural elements indicated in FIG. 18 and FIG. 19.

(4.3.1) In Case of Execution System 1

First, a client transmits a ticket file which is held on the client side from a client machine to a server machine in order to request a use of this ticket file. A ticket file reading unit 1801 of a fee collecting unit which has received the ticket file reads this ticket file, and then issues a ticket file checking instruction. Upon receipt of this ticket file checking instruction, a ticket file checking unit 1802 firstly checks as to whether or not the received ticket file corresponds to such a ticket file which has been issued by the inventory control system operated by the own system. Furthermore, this ticket file checking unit 1802 performs other checking operations, for instance, whether or not a use time limit of this ticket file has expired; whether or not a data updating time exceeds a updating time limit; and also whether or not a data holding time limit has expired. These checking operations are carried out by comparing these item data with such data stored in a ticket information storage unit 1803 of the client. This ticket information storage unit 1803 is contained in the auxiliary storage apparatus 0104 of the server machine. It should also be noted that while a ticket issuing process operation is carried out, a ticket issuing unit 0201 also registers the content of the issued ticket file into the ticket information storage unit 1803.

As a result of checking operation, when it is so judged that the ticket file received from the client cannot be used, the server sends a not-usable notification via a network to the client machine provided on the side of the client.

In the case that the ticket file received from the client can be used, the subsequent process operations are different from each other, depending upon ticket utilizing cases, namely, in one case that this received ticket file is used at a first time, and in another case that this received ticket file is used at a second time and succeeding times.

First of all, in such a case that the received ticket file is used at the first time, the ticket file checking unit 1802 transmits such an instruction to a data copying/writing unit 1703, while this instruction instructs that both a data sort and a data amount indicated in this received ticket file are copied from a data-source storage unit 1704 to a data-destination storage unit 1705. Also, in such a case that a content of data is changed based upon a content entered by a client, the ticket file checking unit 1802 updates the storage content of the ticket information storage unit 1803 by the latest storage content. Further, in order that the content of the ticket file stored in the ticket information storage unit 1803 must be made coincident with the content of the ticket file held by the client, the ticket file checking unit 1802 issues such a ticket file which is formed based upon the updated data, and then transmits this issued ticket file. Otherwise, the ticket file checking unit 1802 transmits changeing instruction information for changing the ticket file so as to update the content of the ticket file held by the client.

In such a case that a ticket file is used at a second time and the succeeding times, if the data used by the client has already been stored in the data-destination storage unit 1705, then no copying operation of the data sort/data amount is required. Also, in such a case that the data stored in the data-source storage unit 1704 is updated when the ticket file is used, if both the storage content of the data-source storage unit 1704 and the storage content of the data-destination storage unit 1705 have already been updated at this time, then no copying operation as to the data sort/data amount is required when the ticket file is used at the second time and the succeeding times. In such a case that the data stored in the data-source storage unit 1704 is not updated, the ticket issuing unit 1701 issues a copying/writing instruction before commencing a process operation when the ticket file is used at the second time and the succeeding times, and thus, the data copying/writing unit 1703 copies the data of the data-source storage unit 1704 to write the copied data into the data-destination storage unit 1705.

Next, the client initiates an inventory control program of an application unit. When the inventory control program is executed, the client enters a necessary item in order to utilize the function of this inventory control system. Upon receipt of this item input, in a software processing unit (corresponding to processing apparatus 0103 of server machine), the inventory control program stored in a software storage unit (corresponding to auxiliary storage apparatus 0104 of server machine) is executed. It should be understood that such data which may be utilized during program execution corresponds to the data which has been stored in the data-destination storage unit 1705. Then, a result of this program execution is outputted via the network to the output apparatus 0106 of the client machine provided in the client.

(4.3.2) In Case of Execution System 2

In the execution system 2, process operations defined until a ticket file received from a client is checked are similar to those in the case of the execution system 1 (4.3.1) shown in FIG. 18. In other words, in such a case that the ticket file is used at a first time, the ticket file checking unit 1802 issues a read-prohibition lifting instruction. Based upon the content of this read-prohibition lifting instruction, the data reading control unit 1706 performs a control operation in such a manner that data defined within a restriction range indicated in the ticket file is read thereinto from the data-source storage unit 1704.

If the read-prohibition lifting state is maintained, then there is no need to issue the read-prohibition lifting instruction when the ticket file is used at the second time and the succeeding times. To increase safety with respect to a data access, if the read-prohibition lifting state is canceled after the ticket file has been used, then the ticket file checking unit 1802 issues a read-prohibition instruction every time the ticket file is used at the second time and the succeeding times, so that such a condition can be made under which the client can access the data-source storage unit 1704.

After the read-prohibition is canceled, the client can use the inventory control program based upon the content of the ticket file. Similar to the execution system 1, the client enters such an input data required to operate the inventory control program, and then, a program is read out from a software storage unit (corresponding to a partial area of auxiliary storage apparatus 0104) in a software processing unit (corresponding to processing apparatus 0103) of the server machine so as to execute the process operation. Then, an execution result is outputted via the network to the output apparatus 0106 of the client machine of the client.

(4.4) Invalidation of Ticket File

Figure 20:
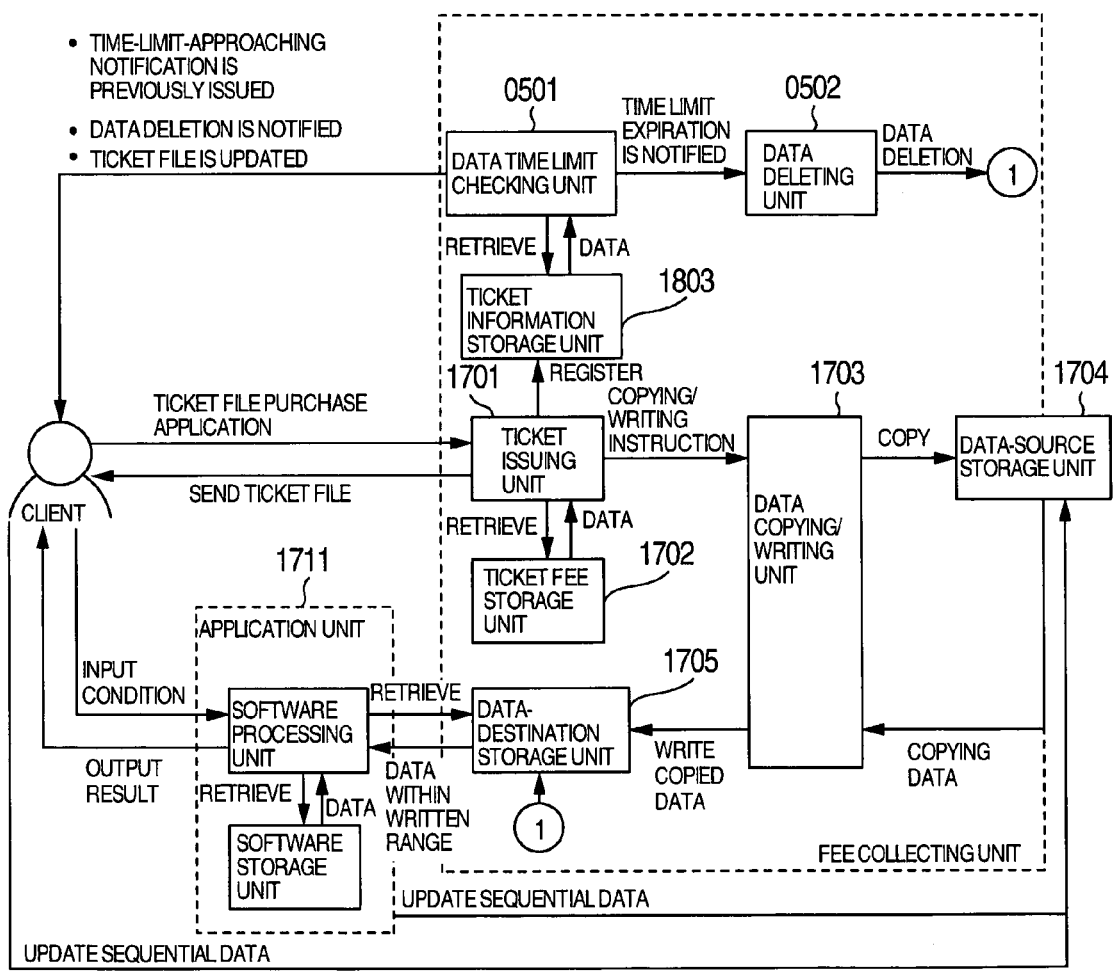
FIG. 20 is an explanatory diagram for explaining a deleting process operation of data.
Figure 21:
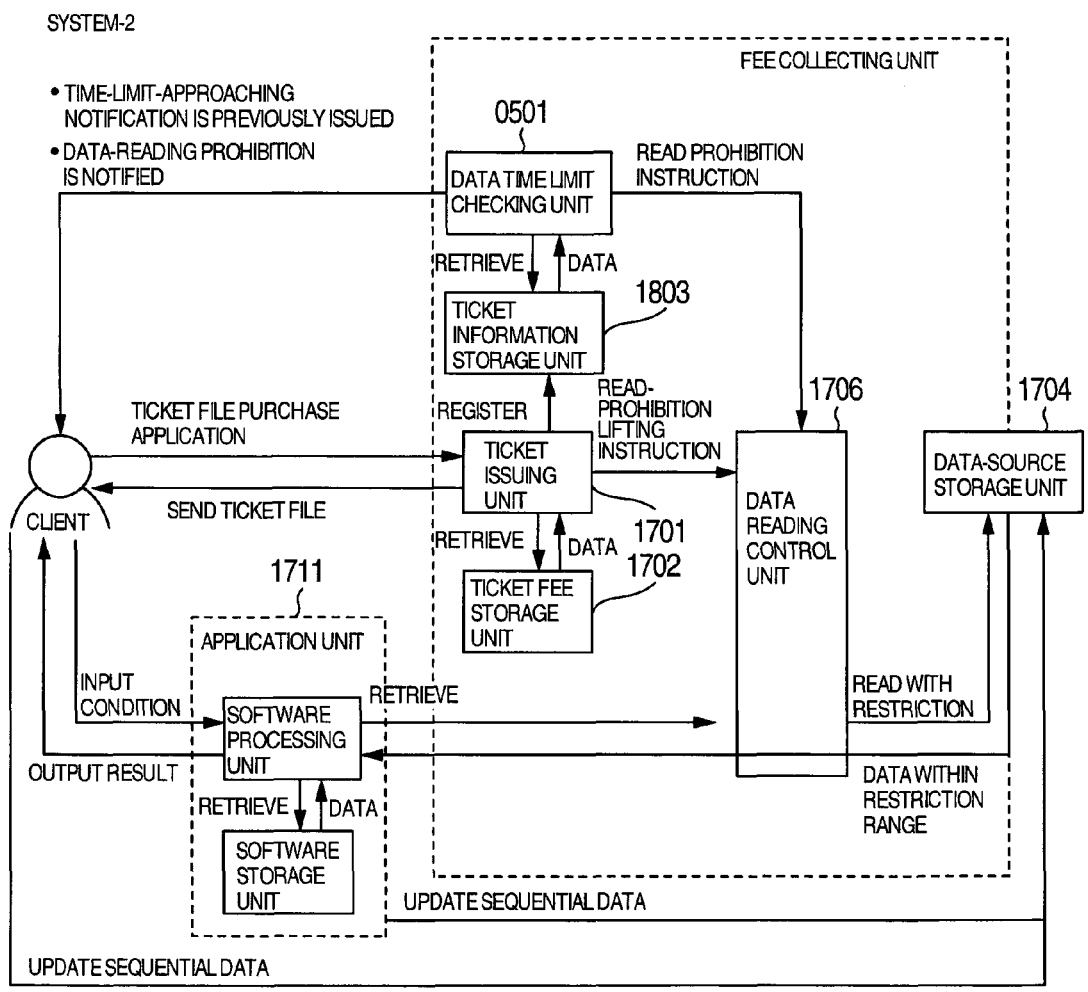
FIG. 21 is a diagram for explaining a read-prohibiting process operation of data.

Finally, a description will now be made of a process operation executed in the case that a ticket file becomes invalid with reference to FIG. 20 and FIG. 21. FIG. 20 is a diagram for explaining a process operation in an execution system 1, and FIG. 21 is a diagram for explaining a process operation in an execution system 2.

(4.4.1) In Case of Execution System 1

A data time limit checking unit 2001 retrieves a storage content of a ticket information storage unit 1803 in either a periodical manner or at predetermined timing so as to check a data use time limit of such a ticket file which has been issued to a client. When the data use time limit has expired, this data time limit checking unit 2001 issues a data deleting notification with respect to a client machine provided on the side of the client, and also, notifies the elapse of this data time limit with respect to a data deleting unit 2002. In the data deleting unit 2002, upon receipt of this notification as to the elapse of this data time limit, data of this client stored in the data-destination storage unit 1705 is deleted. When the client data in which the data use time limit has expired is checked and deleted in the above-explained manner, since the knowhow data of the client is deleted from the server machine, secrecy thereof may be improved and also the possibility as to data leakage may be reduced. It should also be understood that a data use time limit corresponds to an item which may be designated by a client when this client purchases a ticket file, and also implies such a time period during which data and a file designated in the ticket file are stored in the data-destination storage unit 1705 employed in the auxiliary storage apparatus 0104 provided on the side-of the server machine.

(4.4.2) In Case of Execution System 2

Similar to the execution system 1, in this execution system 2, the data time limit checking unit 2001 checks a use time limit as to data. As a result of this checking operation, when the data time limit checking unit 2001 judges that the data time limit has expired, this data time limit checking unit 2001 notifies a data read prohibition via the network to the client machine, and furthermore, issues a read prohibition instruction with respect to the data read control unit 1706. The data read control unit 1706 which has received the read prohibition instruction prohibits a read access operation to the data-source storage unit 1704. In accordance with this function, the inventory control system can avoid not only such a case that the client himself accesses the data-source storage unit 1704 after the data use time limit has elapsed, but also another case that a third party illegally accesses the data-source storage unit 1704, so that secrecy of the data can be increased.

(4.5) Respective Process Flow Operations and Examples of Display Screens

In this embodiment, a purchase of a ticket file, a use of this purchased ticket file, and an invalidation of this purchased ticket file will now be described with reference to flow charts shown in FIG. 23 to FIG. 25, and examples of display screens represented in FIG. 26 to FIG. 32.

(4.5.1) Process Flow Operations and Display Screens as to Purchase/Use of Ticket File First of all, process flow operations as to purchase/use of a ticket file on the side of a client will now be explained with reference to FIG. 23 and FIG. 24. It should be understood that a flow chart of FIG. 24 is a continuation of the flow chart of FIG. 23.

Figure 23:
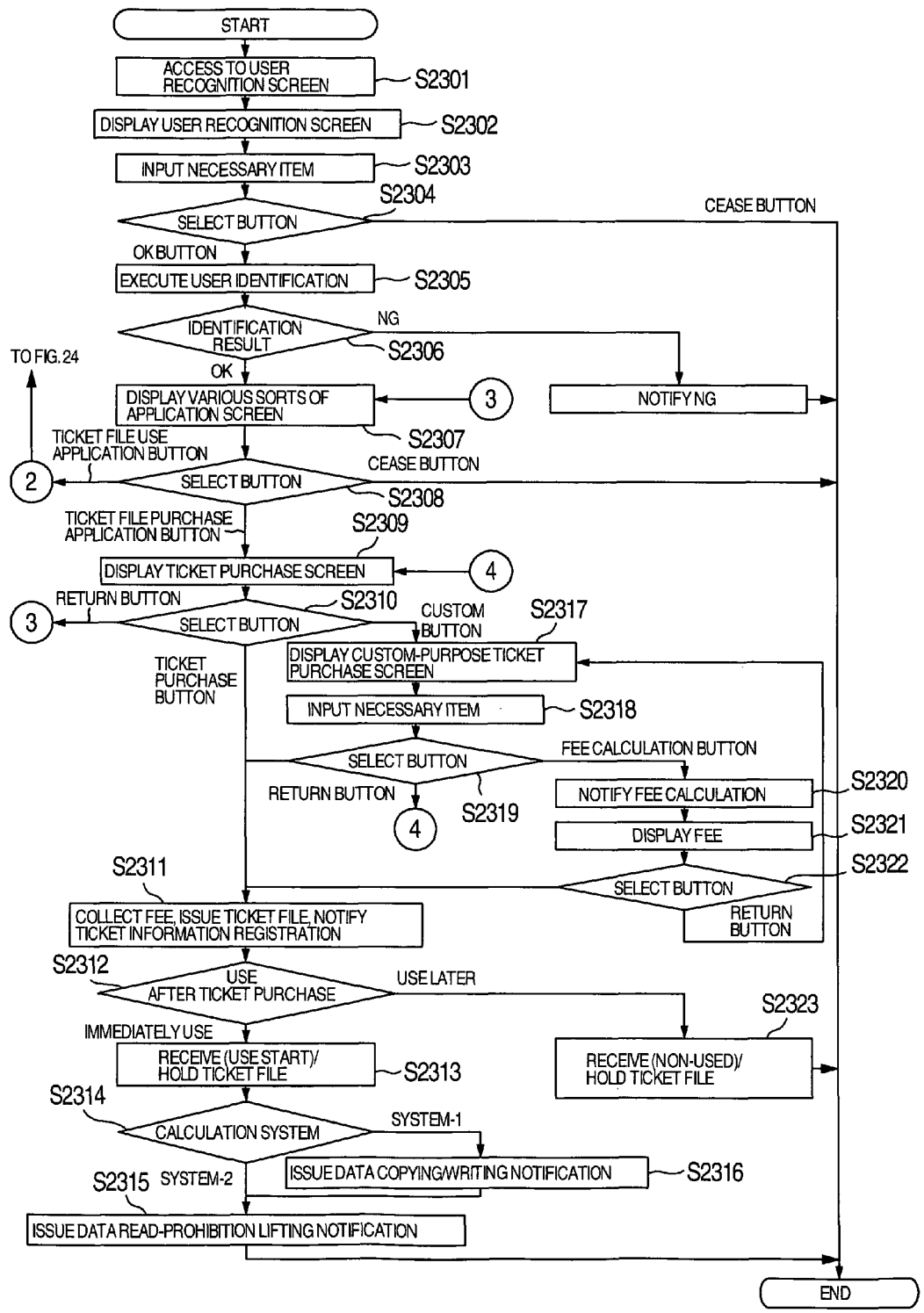
FIG. 23 is a flow chart for indicating operations of client side when functions of the inventory control system are utilized.
Figure 24:
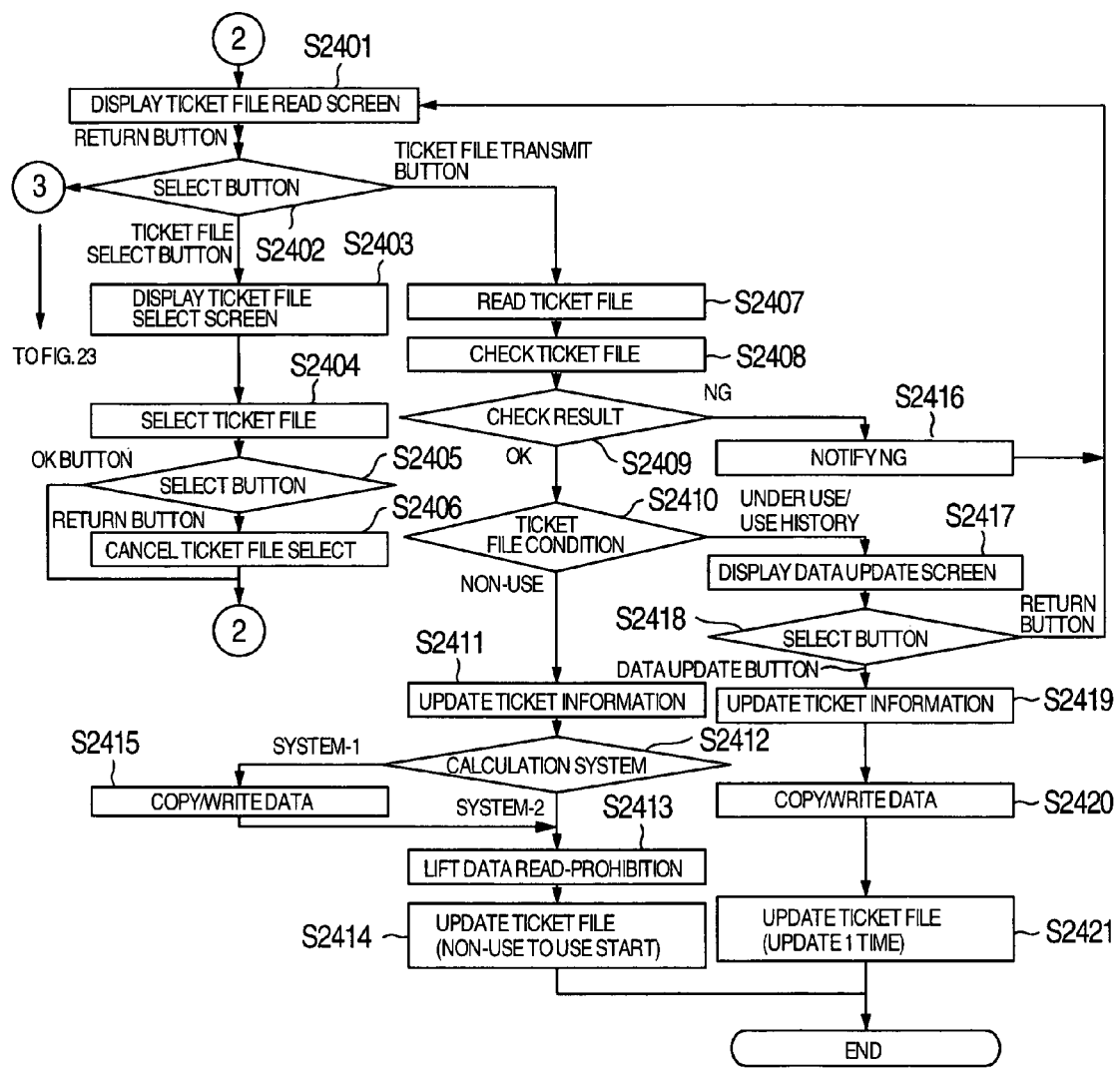
FIG. 24 is a flow chart for indicating operations of client side when functions of the inventory control system are utilized.

As indicated in the flow chart of FIG. 23, when the client firstly accesses the server machine (step S2301), a user identification screen is displayed (step S2302). An example of this user identification screen is shown in FIG. 26A. The client enters such a necessary item as a user number and a password on the user identification screen (step S2303), and then selects a button (step S2304) so as to receive user identification (step S2305). As a result of this identification (step S2306), when it is so identified that this client is such a client who can use the inventory control system, various sorts of application screens as represented in FIG. 26B are displayed on the output apparatus of the client machine (step S2307). The client selects an application button appeared on the screen (step S2308).

In FIG. 26B, when the client selects a ticket file purchasing application button, a ticket file purchase screen is displayed on the output apparatus of the client machine. In FIG. 27, there is shown an example of this ticket file purchase screen. As shown in the example of FIG. 27, while the ASP side prepares plural sorts of ticket files having different conditions, this ticket file purchase screen is displayed in combination with such information as purchasing units, use terms, remaining numbers of tickets, and fees. These conditions cover calculation systems and usable functions fitted to uses of clients, designation/non-designation of tables, restriction/non-restriction of records, and the like. As to a fee of a ticket file, since a data sort and a data amount may be determined which may be utilized by a client, depending upon such a fact as to whether or not a table is designated and whether or not a record is restricted, this fee of the ticket file may reflect thereon these items. The calculation system represents execution time of the inventory control program, and a sort of time periods. A client may select such a ticket file capable of executing a process operation within a desirable time and a desirable time period.

As to a selling sheet of a ticket file, not only this ticket file is sold one sheet by one sheet, but also ticket files may be sold in unit of 10 sheets as illustrated in NO. 1.

When there is a desirable ticket file among the previously-formed ticket files shown in FIG. 27, the client pushes a purchase button of a ticket file (step S2310) so as to purchase this desirable ticket file. Upon receipt of the selection made by the client, the ASP side executes a collection procedure for collecting a fee of the selected ticket file, and issues a ticket file. Then, the ASP side transmits this issued ticket file to the client machine of the client, and also, registers this issued ticket file in the ticket information storage unit 0303 (step S2311).

When there is no such a desirable ticket file among the previously-formed ticket files shown in FIG. 27, the client selects a custom button of a ticket file (step S2310). As a result, a custom-purpose ticket file purchase screen is displayed on the client machine (step S2317). FIG. 28 represents an example of the custom-purpose ticket file purchase screen. The client enters a necessary item in accordance to this purchase screen (step S2318) in order to set a content of a desirable ticket file by this client himself. When this custom-purpose ticket file is purchased, the client selects a fee calculation button (step S2319). As a result, a fee of this custom-purpose ticket file is calculated based upon the condition entered by the client on the side of the ASP. At this time, such a message that the ticket fee is being calculated is displayed on the side of the client machine (step S2320). When the fee calculation is ended, a calculation result is displayed on the display screen of the client machine (step S2321). The client manipulates a selection button based upon this calculation result. In the case that the client makes a ticket purchase decision, the ASP side executes the process operation defined in the step S2311, which has been previously explained, and also, notifies such a message to the client machine.

In the case that the purchased ticket file is immediately used, the process operation can be executed after the procedure such as the user identification has been made, and the content of the ticket file is updated based upon the use of this purchased ticket file. Thereafter, the ticket file is transmitted to the client machine of the client (step S2313). Next, in the case of the execution system 1 of the inventory control system, such a data usable on the ASP side is copied/written from the data-source storage unit to the data-destination storage unit. When the data writing operation of the data-destination unit can be carried out on the ASP side, a data read-prohibition lifting notification is displayed on the side of the client (step S2315). Since the execution system 2 corresponds to such a method that a limitation is made in data reading operation without performing a data copying/reading operation, a data read-prohibition lifting notification is displayed in a step subsequent to the step S2314.

In such a case that the client merely purchases a ticket file, and once logs out the inventory control system while the client immediately uses the purchased ticket file, and logs in this inventory control system so as to use this purchased ticket after a certain time period has passed (namely, right branch of step S2312), since the ticket file has not yet been used at the purchasing time instant of this ticket file, the unused ticket file is sent to the client, and then, this client stores the received ticket file (step S2323).

Figure 31:
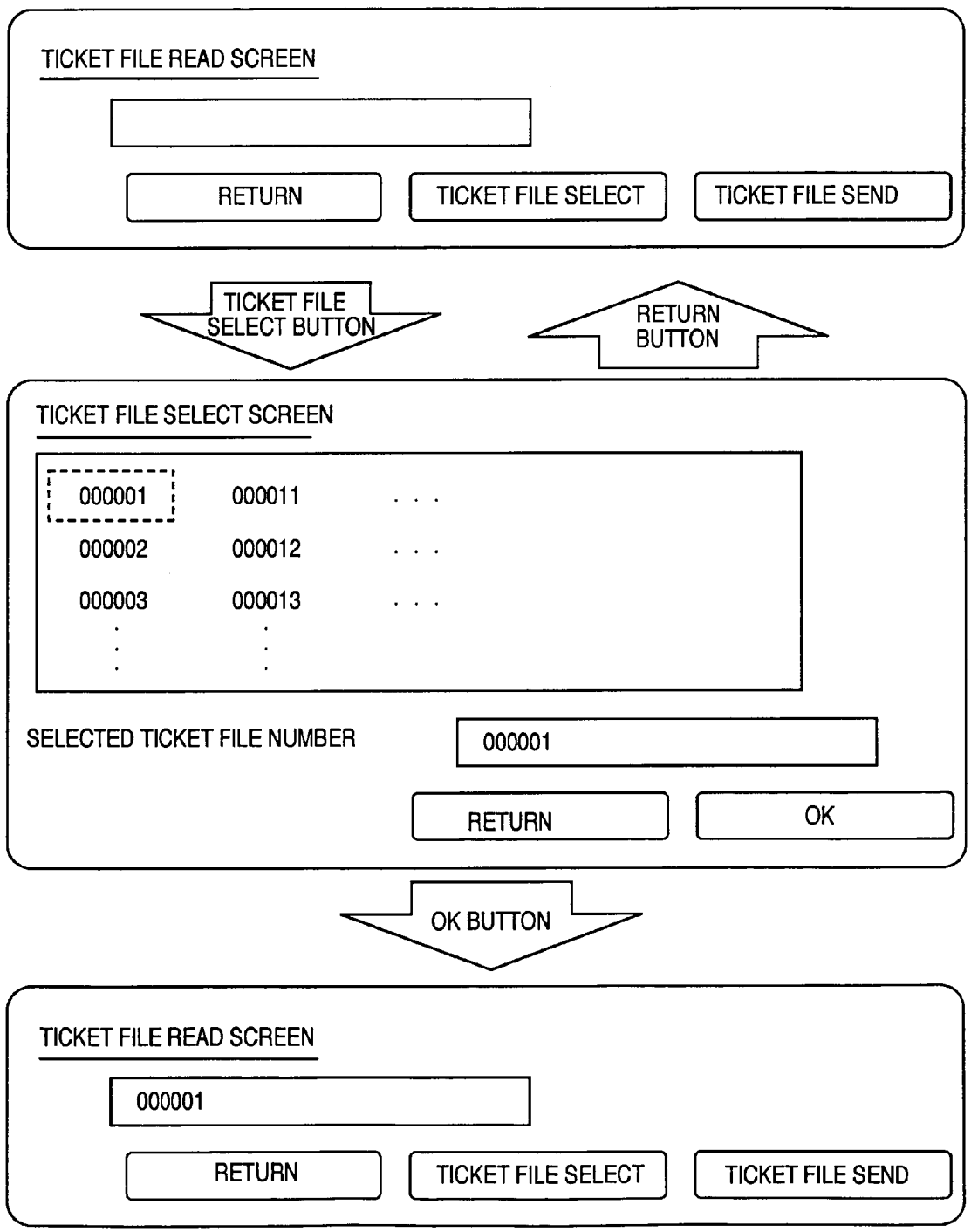
FIG. 31 illustratively represents another example of an output screen of the client machine.

When the client selects a ticket file use application button in FIG. 26B, a ticket file read screen indicated at the uppermost position of FIG. 31 is displayed on the client side. In such a case that while the client owns a plurality of ticket files, the client has not yet determined a ticket file to be used, when the client pushes a ticket file selection button (step S2402), such a ticket file selection screen indicated at a center position of FIG. 31 is displayed. When the client selects the number "000001" corresponding to the ticket file exemplified in FIG. 22, such a ticket file read screen shown in a lower diagram in FIG. 31 (step S2403 of FIG. 24), and thus, such a ticket file of "000001" may be specified. Subsequently, when the client pushes a ticket file send button, the previously-selected ticket file is transmitted via the network to the server machine of the ASP side, so that the transmitted ticket file is read (step S2407).

Next, the ticket file checking process operation is carried out (step S2408) which has been explained with reference to FIG. 18 and FIG. 19 in order to judges as to whether or not this transmitted ticket file can be used in the own inventory control system (step S2409). In the case that this sent ticket file can be used, a process operation for investigating a state of the ticket file is carried out (step S2410). In this case, in the case that the ticket file corresponds to a non-used ticket file, this non-used ticket file is updated to be brought into a use state (step S2411), and then, the updated ticket file is stored in the ticket information storage unit 1803. Then, a calculation system indicated in this updated ticket file is judged (step S2412), and the inventory control program is carried out by executing either a data copying/writing process operation (step S2415) or a data read-prohibition lifting process operation (step S2413).

Next, updating operation of a content of data will now be explained in such an example case that the data stored in the data-destination storage unit 1705 is updated based upon a use result as to a ticket file number "000002." This data updating operation is carried out in order that the inventory control program is carried out based upon either the latest data or data having higher precision. FIG. 32 indicates a display example of a data update screen. In a step S2410 of FIG. 24, as a result of confirming a condition of a ticket file, in the case that the ticket file is being used, or owns a use history, such a data update screen as shown in FIG. 32 is displayed on the side of the client machine (step S2417), so that the client is required to confirm as to whether or not this client has the will of updating the-data. When the client selects a data update button (step S2418), the ticket information is updated (step S2419), and the data copying/writing process operation is carried out (step S2420) so as to update the ticket file.

In combination with this updating process operation of the ticket file, a total data updating time of the ticket file is also updated from the remaining 10 times to 9 times (step S2421). The updated ticket file is stored into the ticket information storage unit 1903, and also, is transmitted via the network to the client machine. The above-explained updating process operation as to the ticket file has been explained by employing the case of the execution system 1. Further, as to the execution system 2, this ticket file updating process operation may be realized by updating a storage content of the data-source storage unit.

(4.5.2) Content of Ticket File and Screen Display

Next, a description will now be made of a custom-purpose ticket file, a content designated by this custom-purpose ticket file, and also an example of a screen display thereof. This custom-purpose ticket file corresponds to such a ticket file which is formed by a customer in such a case that a ticket file desired by a client is not contained within previously-formed ticket files. FIG. 28 to FIG. 30 are diagrams for illustratively showing an example of screens displayed on a client machine of a client in the case that a custom-purpose ticket file is purchased.

When such a client who tries to purchase a custom-purpose ticket file selects the custom button at the step S2310 of FIG. 23, such a custom-purpose ticket file purchasing screen as exemplified in FIG. 28 is displayed. The client designates items in accordance with this purchasing screen. As the item, first of all, a user number is employed. Next, the client designates a calculation system. Contents of items subsequent to this calculation system will be explained as follows:

(Item 1) Calculation System

Figure 33:
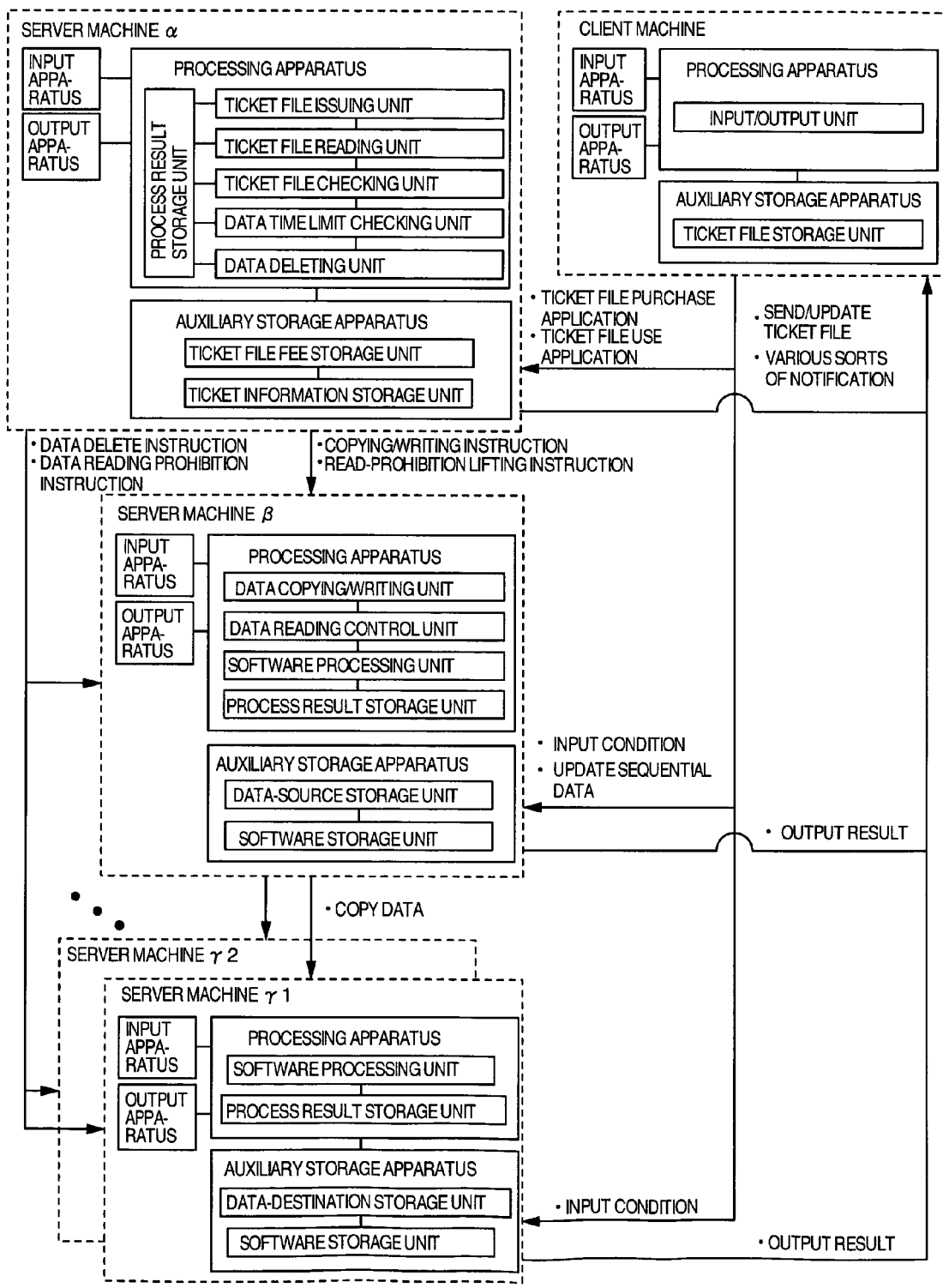
FIG. 33 is a hardware structural diagram for representing such a case that the inventory control system is arranged by a plurality of servers.

On the side of the ASP (Application Service Provider), in order that the client can acquire execution results of the inventory control program within a desirable time and a desirable time period, a plurality of calculation systems are provided by using a plurality of server machines. FIG. 33 indicates a structural diagram of such a system containing a plurality of server machines.

In this embodiment mode, a description will now be made of such a case that three different sorts of calculation systems, namely, a calculation system 1A, a calculation system 1B, and a calculation system 2 are prepared. First, both the calculation system 1A and the calculation system 1B correspond to such calculation systems which may be realized by employing the execution system 1 corresponding to such a method that data used in a calculation is copied and written from a data-source storage unit to a data-destination storage unit. The execution system 1 may be executed by employing server machines "γ1", "γ2", - - - , of FIG. 33. Also, the calculation system 2 corresponds to such a method that a restriction is made in accessible data without copying/writing data. The execution system 2 may be executed by employing a server machine "β" shown in FIG. 33.

The respective calculation systems 1A, 1B, and 2 are explained as follows:

The calculation system 1A corresponds to a reservation possessing system in which while a client solely possesses either one set or plural sets of server machines "γ", a process operation is executed. When the calculation system 1A is desirably used, a client selects the calculation system 1A as the calculation system of (2) on the custom-purpose ticket file purchase screen of FIG. 28. As a result, such a server machine "γ" reservation condition screen as indicated in FIG. 29 is displayed. The client confirms a reservation condition indicated in a table every server machine, and then selects a column of "empty" where no reservation is made so as to reserve a server machine capable of executing a process operation. When the calculation system 1A is employed, since the selected server machine "γ" is not used by other clients, the inventory control program can be firmly executed within a predetermined time. Alternatively, in the case that the calculation system 1A is selected, the following case may be conceived. That is, while the reserved server machine "γ" is solely possessed on a reserved day and/or within a reserved time period, the inventory control program may be utilized, whereas while the calculation system 2 is additionally employed on any days and/or any time periods other than the reserved day and/or the reserved time period, which are defined within a use time period of a ticket file, this inventory control program may be utilized.

The calculation system 1B corresponds to such a system that the inventory control program is executed by utilizing a server machine "γ" which is not reserved by the client of the calculation system 1A in principle. As a consequence, in such a case that there are many server machines which have been reserved, a calculation speed for executing the inventory control program cannot be guaranteed. However, in the case that there are many server machines operated under empty states, a high-speed calculation of the inventory control program may be realized by way of a parallel calculation function executed by plural sets of server machines "γ." Also, in accordance with the calculation system 18, when other clients use the server machines "γ" and thus the user conditions thereof are busy, this calculation system 1B may be switched to another calculation system 2. The switching operation of these calculation systems is carried out based upon a predetermined condition, while utilization conditions of both the server machine "γ" and the server machine "β" are considered. Also, such a process operation for again switching the calculation system 2 into the calculation system 1B may be carried out based upon condition. Since this switching function is employed, optimum/flexible calculation environments may be provided with respect to such a client who selects the calculation system 1B, depending upon a reservation condition of the server machine "γ." Considering the functional aspects, the calculation system 1B may guarantee the operation of the calculation system 2 under minimum condition. Also, when the client wants to use the calculation system 1B, the server machine "γ" reservation condition screen as shown in FIG. 29 may be displayed to the client side before the client determines/selects the calculation system 1B, and thus, the client may investigate a reservation-free condition of the desired use day of the system function.

The calculation system 2 corresponds to such a system that while the server machine "β" shown in FIG. 33 is commonly owned by a plurality of clients, the inventory control program is executed. Generally speaking, when this calculation system 2 is compared with both the calculation system 1A and the calculation system 1B, although a calculation speed of this calculation system 2 is slower than the calculation speeds of these calculation systems 1A and 1B, this calculation system 2 can be provided in low cost. When the calculation system 2 is selected, the inventory control program is continuously carried out by this calculation system 2 without switching the calculation systems.

In FIG. 33, the system is so arranged by that the server machine "β" owns the data-source storage unit, and the server machine "γ" owns the data-destination storage unit. Alternatively, a data-source storage unit may be provided also in the server machine "γ." Also, in the structural example shown in FIG. 33, while the server machine "α" is independently employed with respect to the server machines "β" and "γ" which execute the calculating process operation of the inventory control program, this server machine "α" may play a role as the management server for managing the ASP side. The server machine "α" executes the issuing process operation of the ticket file, the registering/checking process operations of this ticket file, and also executes the data deleting process operation.

Also, in this embodiment mode, such a case that the three sorts of calculation systems are provided by the ASP side has been described. However, the present invention is not limited only to these three calculation systems.

(Item 2) Names of Usable Functions

In the software processing units of the application units 1711 shown in FIG. 17 to FIG. 21, the below-mentioned process operations may be carried out by employing the programs stored in the software storage units:

(1) A demand predicting process operation for calculating a predicted value of a demand.

(2) An actual value totalizing process operation for calculating an actual value to be compared with a predicted value.

(3) A predicted remainder calculating process operation for calculating a remainder between a predicted value and an actual value.

(4) A parameter calculating process operation for calculating a parameter such as standard deviation.

(5) A safety stock calculating process operation for calculating soft inventory based upon the above-described parameter.

Based upon these process operations, a demand plan (demand scheme), a supply plan (supply scheme), an inventory analysis, and the like are set as the usable functions.

(Item 3) Table Designation

Next, a table designation and a record restriction will now be explained. As exemplified in the display screen of FIG. 28, the following example is explained. That is, while the calculation system 1A is selected as the calculation system, such a reservation is made that a server machine "γ1" will be used on Jan. 5, 2001.

In the screen display example shown in FIG. 28, the client selects both the supply plan and the inventory analysis as the usable function name. Also, the client selects both a "history table" and an "assumption table" as a table to be used. These tables have been stored in the data-source storage unit 1704.

Figure 34:
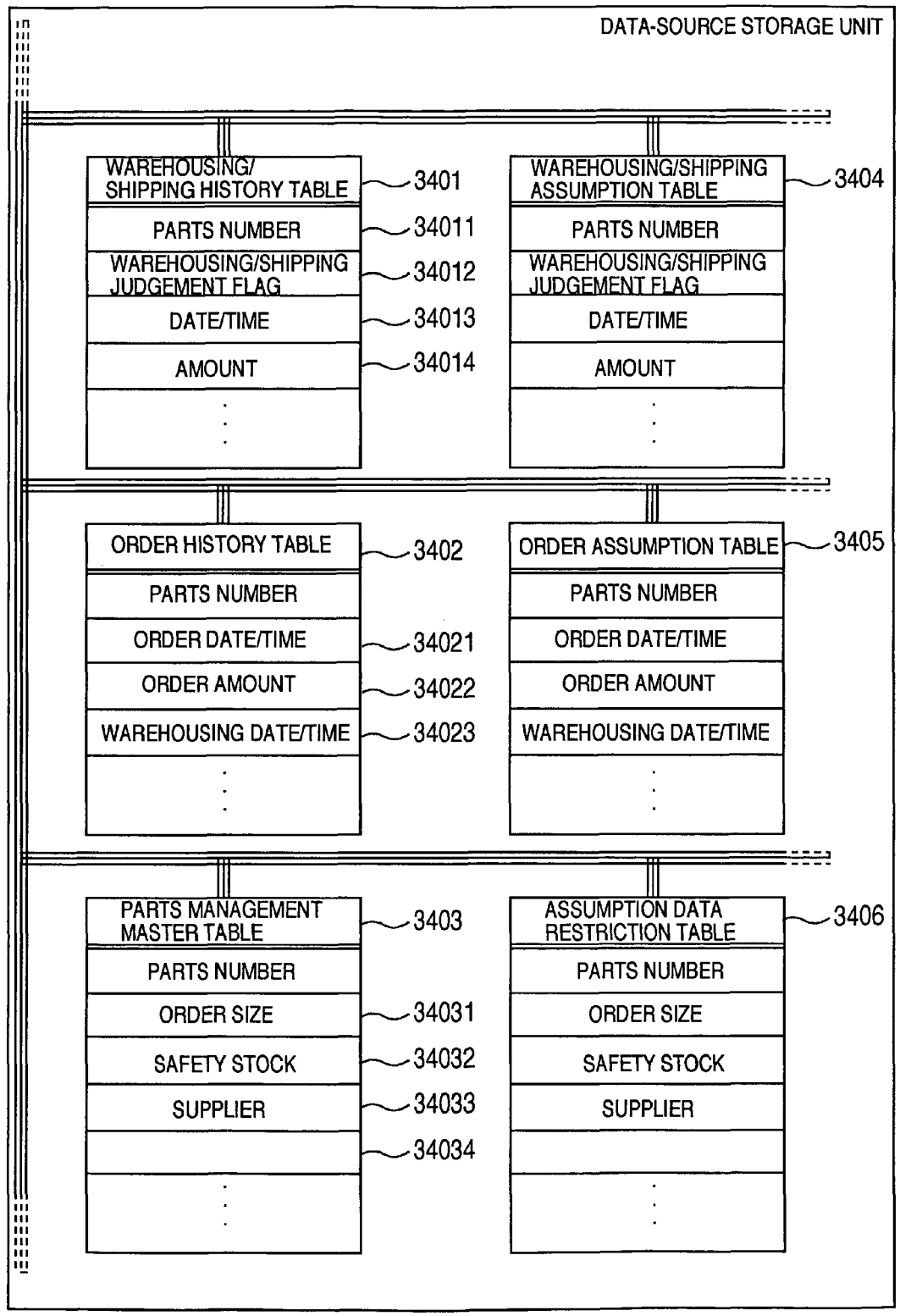
FIG. 34 is an image diagram for indicating a table structure of a data source storage unit.

FIG. 34 represents an image diagram of a table group which has been stored in the data-source storage unit. As the tables stored in the data-source storage unit, there are a warehousing/shipping history table 3401, an order history table 3402, a parts management master table 3403, a warehousing/shipping assumption table 3404, an order assumption table 3405, and an assumption data restriction table 3406, while inventory relative data has been stored in these tables. In this case, this inventory relative data implies both information related to warehousing amounts, shipping amounts, warehousing date/time and shipping date/time, and also another information indicative of management conditions and inventory bases of maintenance parts such as parts numbers, order sizes, and safety stock.

Both the warehousing/shipping history table 3401 and the warehousing/shipping assumption table 3404 are equipped with various columns such as a parts number column 34011, a warehousing/shipping judgement flag column 34012, a date/time column 34013, a quantity column, and the like. Number information used to specify parts is held in the parts number column 34011. Information used to discriminate warehousing product from shipping product is held in the warehousing/shipping judgement flag column 34012. The date/time column 34013 holds date/time information such as warehousing date/time and shipping date/time. The quantity column 34014 holds such an information indicative of both a warehousing amount and a shipping amount, which have been processed, or will be processed at the date/time of the date/time column 34013.

Both the order history table 3402 and the order assumption table 3405 are provided with various columns such as an order date/time column 34021, an order amount column 34022, a warehousing date/time column 34023 and so on.

Both the parts management master table 3403 and the assumption data restriction table 3406 are equipped with an order size column 34031, a safety stock column 34032, a supplier column 34033, an order system column 34034 and the like.

It should be noted that history data are held in both the warehousing/shipping history table 3401 and the order history table 3402, while the history data contain warehousing amounts, shipping amounts, and stocking amounts, which have been actually produced from the past time up to the present time. In contrast thereto, both warehousing/shipping assumption table 3404 and the order assumption table 3405 hold such assumption data as warehousing amounts, shipping amounts, and stocking amounts, which are assumed to be produced from the present time up to the future time. The parts management master table 3403 holds such information indicative of both management conditions and inventory bases as to maintenance parts such as parts numbers, order sizes, and safety stock, which are being used in the present time. The assumption data restriction table 3406 holds a restriction condition which has been previously assumed by the client.

It should also be understood that although the data of the data-source storage unit have been stored in the database format, these data may be stored in a file format.

(Item 4) Record Restriction

Next, a record restriction will now be explained.

FIG. 35 is an explanatory diagram for explaining a record restriction.

As represented in FIG. 35, this record restriction implies that a range of a record which can be utilized among data of a table is designated when a ticket file is purchased. In FIG. 35, an example of a record range which is allowed to be used is indicated by a wide line. The record restriction may be set every table.

In the example of FIG. 28, as the record restriction, "area II (larger than, or equal to "a" and smaller than "b")" is designated. The record restriction may be freely set by the client, and also may be selected from a range which is prepared by the ASP side. In the example of FIG. 28, the ASP side prepares three areas constructed of an area I, another area II, and another area III every time period. In this embodiment mode, the entire area is segmented into three areas. This segmentation is made in accordance with important degrees of an object to use the inventory control program. The client may select the area I in such a case that the client wants to use software in order to achieve an object of correcting the safety stock by changing the procurement lead time and the like. The client may select the area II in such a case that the client wants to use software in order to achieve an object of an inventory prediction, and a short-term detail inventory plan. The client may select the area III in such a case that the client wants to use software in order to achieve an object of a long-term master inventory plan.

(Item 5) Column Restriction

Next, a column restriction will now be described. In FIG. 28, no column restriction is set. As indicated in the example of the various sorts of table in FIG. 34, while one table is constituted by a plurality of columns, the client may select such a column which is wanted to be used, or may select an unnecessary column.

(Item 6) Other Items

In FIG. 28, a data use time limit is designated as "2001/04/12." Also, a total data updating time of the data-source storage unit 1705 is designated as 10 times. In the case of the execution system 1 shown in FIG. 17, the data stored in the data-source storage unit 1704 may be freely and sequentially updated in response to a use of the inventory control program. The reason why the total updating time of the data-destination storage unit 1705 is given as follows: That is, the data which is employed so as to actually execute the inventory control program corresponds to such a data which is stored in the data-destination storage unit 1705. Also, in the case of the execution system 2 shown in FIG. 17, since the data-destination storage unit 1705 is not present, when the total data updating time is designated as 10 times, this case implies that the total data updating time of the data-source storage unit 1704 which is actually accessed is allowed as 10 times.

When a custom-purpose ticket file is purchased, a fee thereof may be calculated before the purchase of this custom-purpose ticket file is determined. FIG. 30 shows an example of a screen which displays a result of a fee calculation.

Selling of ticket files with respect to clients may be realized not only by ASPs (Application Service Providers), but also intermediaries such as sales agents and operating enterprises of "e-Market Place." This "e-Market place" implies services available on the Internet which may intermediate electronic commercial trades among sales agents and/or enterprises, through which a plurality of sellers and a plurality of buyers can seek transaction counter parties with better conditions on home pages.

(4.5.3) Flow Operation Before Ticket File is Invalidated

Figure 25:
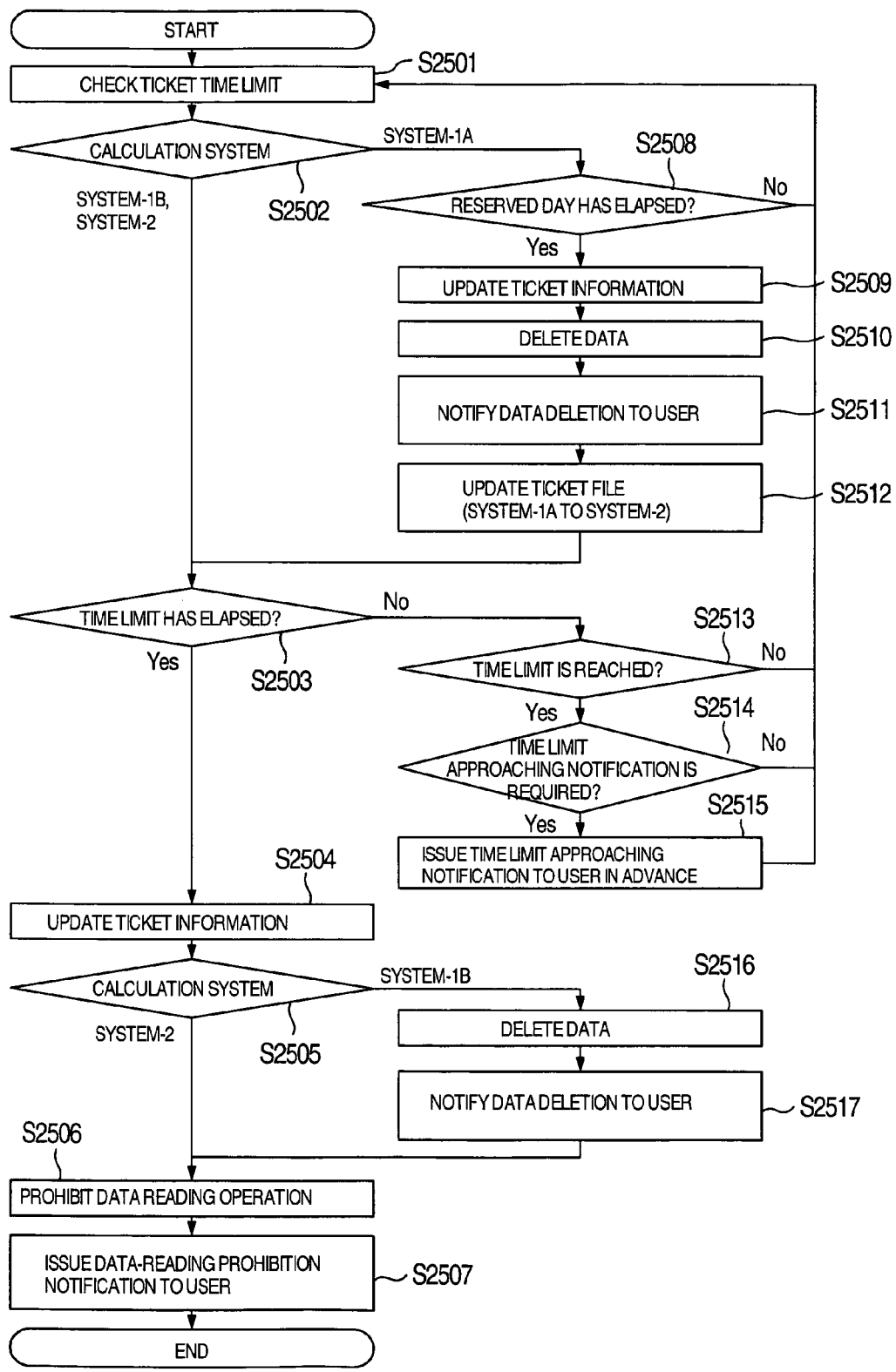
FIG. 25 is a flow chart for explaining process operations before the ticket file is invalidated based upon the ticket file.

Finally, a description is made of a flow operation executed before a ticket file is invalidated with a flow chart of FIG. 25. The inventory control system according to this embodiment mode contains a data time limit checking unit 2001 for checking a use time limit of a ticket file. The data time limit checking unit 2001 firstly discriminates a calculation system designated by a ticket file (step S2502) by referring to a content of this ticket file (step S2501). In the case of the calculation system 1A, since both a server machine for executing a program and an execution date have been reserved, the data time limit checking unit 2001 refers to this content and thus confirms as to whether or not a reserved date has elapsed (step S2508). In such a case that the reserved date has elapsed, the information of the ticket information storage unit 1803 is updated (step S2509), and the data deleting unit 2002 deletes the data of the data-destination storage unit 1705 (step S2510), and such a message that the data has been deleted is notified to the client (step S2511). In this case, when a time limit has been set in the ticket file, since the reserved date has already elapsed, the calculation system 1A cannot be used. However, the calculation system is changed from the calculation system 1A into the calculation system 2 in order that the inventory control system can be utilized within the use time period (step S2512).

In the case of both the calculation system 1B and the calculation system 2, the data time limit checking unit 2001 checks as to whether or not the data use time limit has elapsed (step S2503). When the data use time limit has elapsed, the data time limit checking unit 2001 updates the information of the ticket information storage unit 1803 (step S2504), and judges a sort of the calculation system (step S2505). In the case of the calculation system 1B, a data deleting process operation is carried out (step S2516), whereas in the case of the calculation system 2, a data read-prohibition processing operation is carried out (step S2506), and then, such a message that the data reading operation is prohibited is notified to the client. Even when the data use time limit has not yet elapsed, the data time limit checking unit 2001 judges as to whether or not the time limit comes soon (step S2513). When the time limit comes soon, the data time limit checking unit 2001 judges as to whether or not such a notification is required (step S2514). That is, such a fact that the time limit comes soon is notified to the client. If such a notification is required, then the data time limit checking unit 2001 notifies such a fact via the network to the client (step S2515).

When the data deleting process operation is carried out and the data access-prohibition processing operation is carried out in the above-explained manner, secrecy of the data can be improved.

(5) Setting of Fee System

Figure 36:
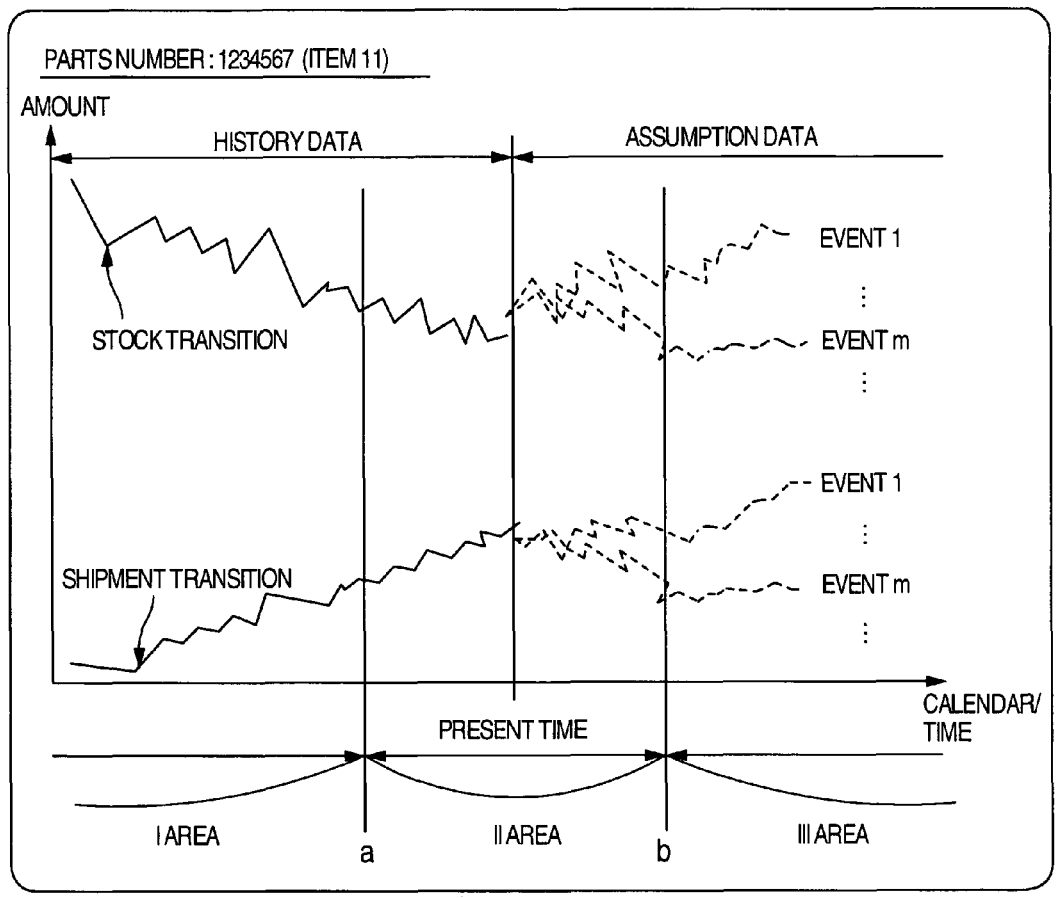
FIG. 36 is a diagram for explaining one mode of the fee system.

Referring now to FIG. 36 and FIG. 38, a description is made of setting of a fee system.

FIG. 36 is a graph for indicating an example of both history data and assumption data as to both an inventory transition (inventory change) and a shipment transition (shipment change). The history data corresponds to an actual value and also one sort of event. As to the assumption data, plural sorts of events (1 to m) may be predicted in accordance with a restriction condition which has been previously assumed by a client. The client may utilize any of these event data.

In the graph of FIG. 36, the record restriction explained in (ITEM 4) is shown. This graph also indicates a correspondence relationship between the area I/area II/area III, which have been set by the ASP side, and both the history data and the assumption data. The ASP side may collect fees with respect to a use of the inventory control system in response to an area designated by the record restriction. One example of the fee collections is indicated in a table of FIG. 36. A data area unit table indicated in the table of FIG. 36 constitutes a fee collection in accordance with a merit of a use purpose by a client. The following fee system is set in this table of FIG. 36: namely, the area I corresponds to 0.36 yen/1 record; the area II corresponds to 1.01 yen/1 record; and the area III corresponds to 0.63 yen/1 record.

Figure 37:
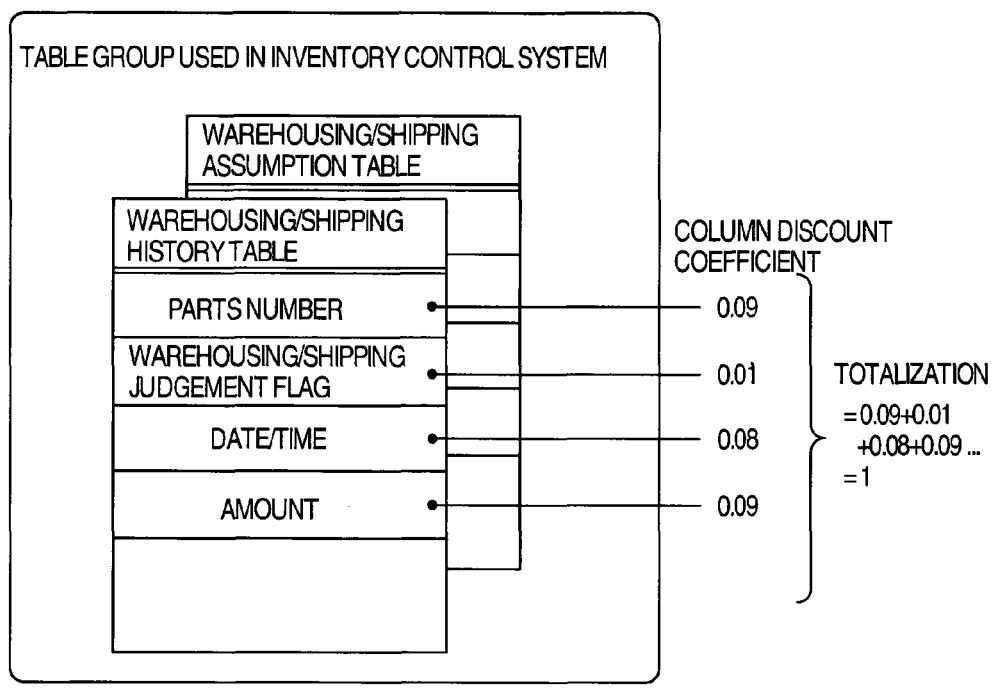
FIG. 37 is a diagram for explaining another mode of the fee system.
Figure 39:
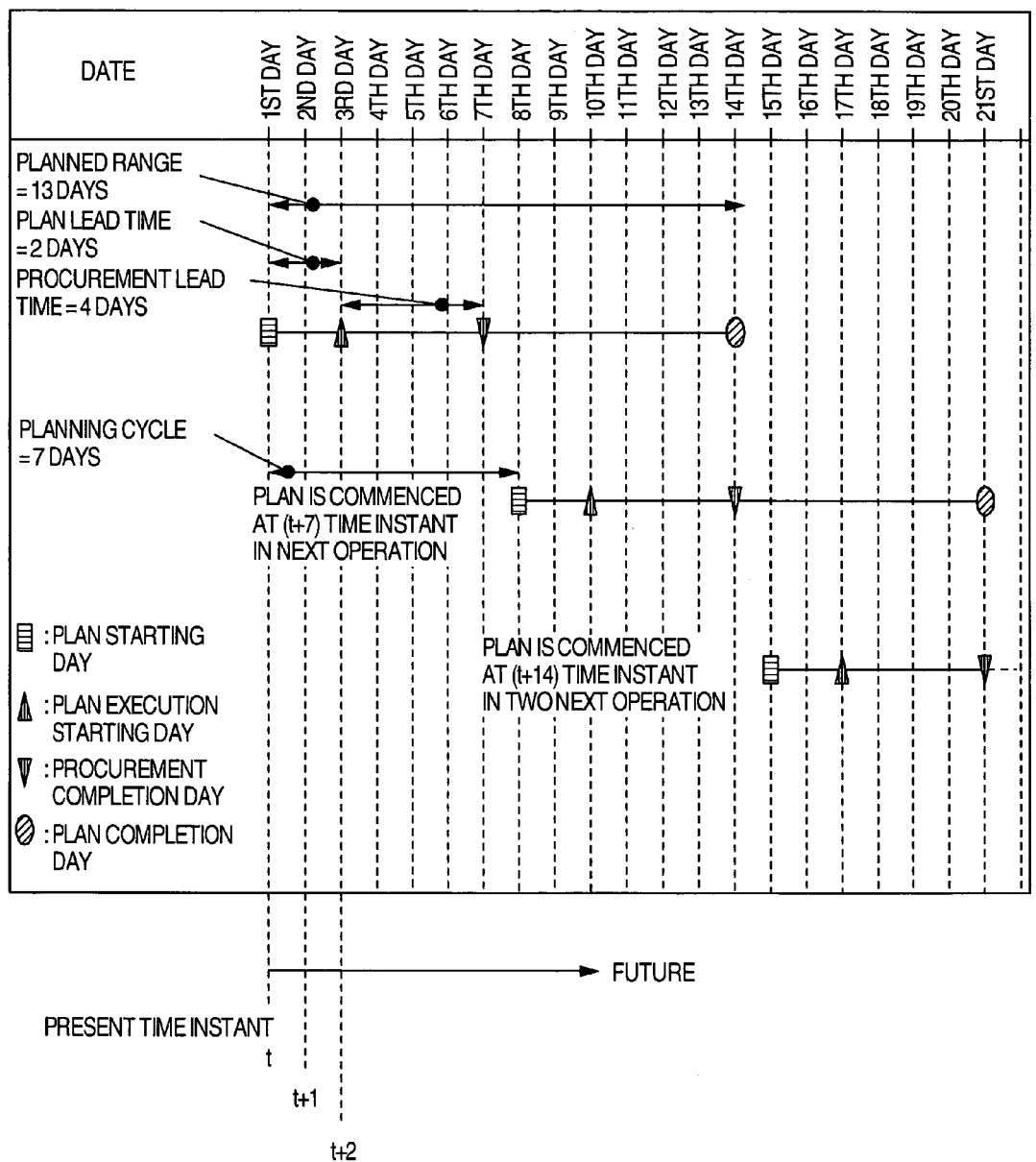
FIG. 39 is a diagram for explaining a definition as to values which are set when a scheme is made.
Figure 40:
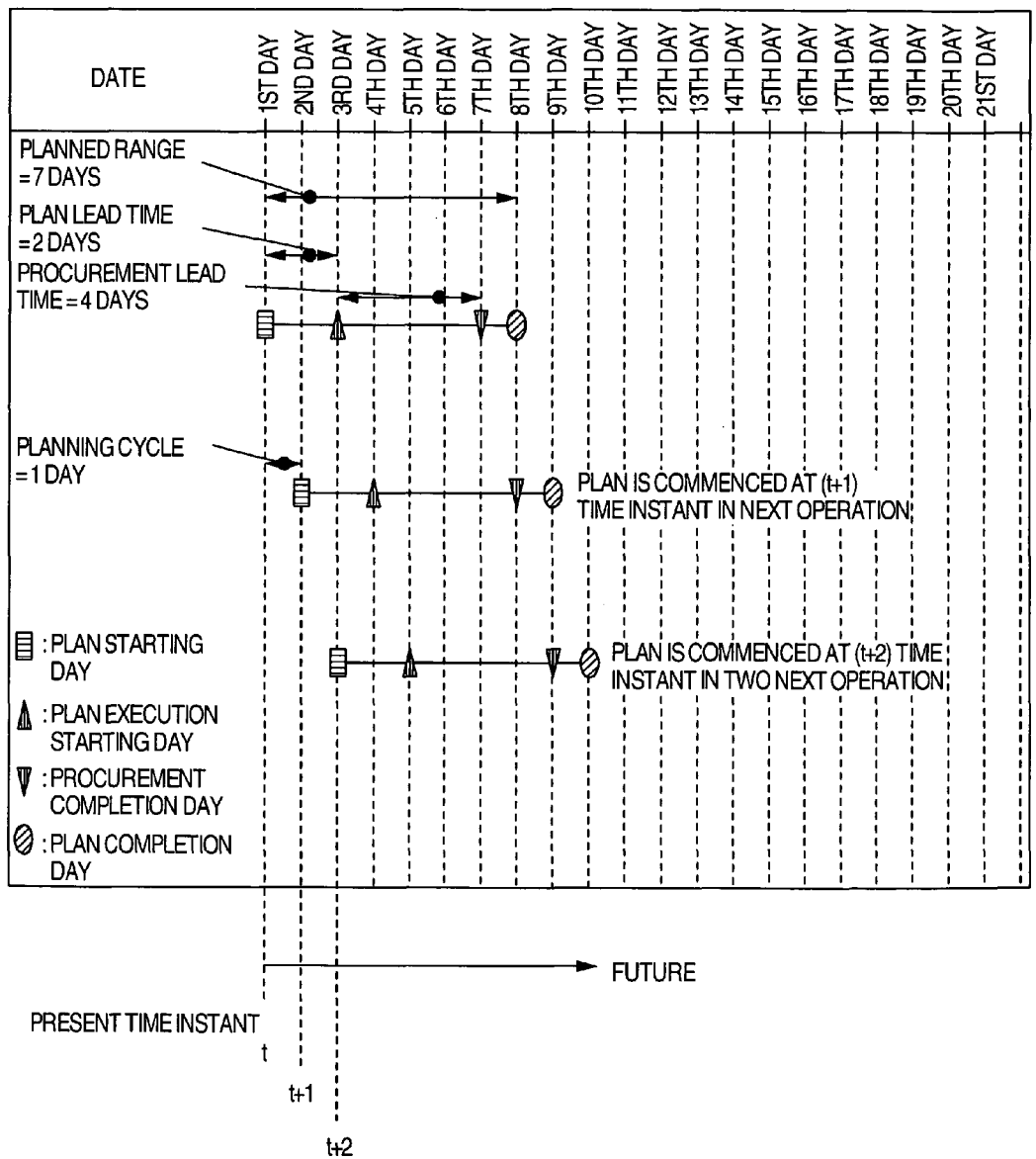
FIG. 40 is a diagram for explaining a definition as to values which are set when a scheme is made.

FIG. 37 represents one example of a fee collecting method based upon the column restriction. A single table is constituted by a plurality of columns. The client may select such a column which is wanted to be used, or may select an unnecessary column when a ticket file is purchased. FIG. 37 represents such a fee collecting method based upon a column restriction of a warehousing/shipping history table. For instance, the fee collecting method is carried out by setting a column discount coefficient in such a way that a parts number column corresponds to 0.09; a column of a warehousing/shipping judgement flag corresponds to 0.01; a date/time column corresponds to 0.08; and a column of a warehousing/shipping amount corresponds to 0.09. Since the ASP side sets the column discount coefficient by considering the data use merits held in the respective columns, the fee collecting method can be carried out in response to the use merits of the data. A fee defined based upon both the record restriction and the column restriction may be calculated by employing an accumulated total of discount coefficients of unnecessary columns as follows:

data area unit price×total record number×(1−accumulated total of column discount coefficients).

Also, the fee collecting method may be realized based upon either such a "machine performance" or a "total data updating time" as represented in FIG. 38.

FIG. 38 indicates an example of such a fee collecting method executed by a sort of machine performance, by setting whether or not a time limit approaching notification is issued, and by a sort of total data updating time.

In the example of FIG. 38, the fee collecting condition is set in such a manner that, for instance, a high-performance machine is set to a unit price of 1000, and a medium-performance machine is set to a unit price of 500, namely, in accordance with performance of server machines. Also, in the case that the time limit approaching notification is set, a unit price is set to 10, whereas as to the total data updating time, a unit price is set to 10 in the case that a total data updating time is larger than, or equal to 1 time, and smaller than 100 times. These fee collections correspond to such fee collections which may be determined in response to the performance and the use frequency of the used hardware.

Alternatively, the fee collection may be made by judging as to whether or not the time limit approaching notification is issued, which is performed when the use time limit of the ticket file comes soon. This is the fee collection made in response to the service.

In accordance with the present invention, updating of the set values such as the planning cycle, the procurement lead time, and the plan lead time can be immediately changed into the safety stock, and thus can be continuously maintained as the proper values.

Also, since the payments of the fees which are caused by providing and utilizing the functions of the inventory control system are established based upon the ticket file in the inventory control system according to the present invention, the company which provides the functions of this inventory control system can firmly collect the fees, and further, can demand the client to pay the fees determined in accordance with the used functions thereof, whereas the client can readily draw up a budget.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An inventory control system, comprising:
   a server machine having a central processing unit (CPU) and a storage apparatus;
   the storage apparatus storing an inventory control program;
   the inventory control program being executable by the CPU;
   the inventory control program comprising:
   demand predicting means for calculating a predicted value of a demand based on past actual demand information;
   actual value retrieval means for retrieving an actual value of demand which is compared with the predicted demand value;
   predicted remainder calculating means for calculating a predicted remainder which is a difference between the predicted demand value and the actual demand value;
   parameter calculating means for calculating a parameter of standard deviation by employing the predicted remainder;
   safety stock calculating means for calculating a safety stock based upon said parameter; and
   input means for accepting setting or updating of a setting value such as a planning cycle and at least one of a procurement lead time and a plan lead time, and
   wherein the storage apparatus stores therein, in time sequence, respective setting values and the past actual demand information at every unit time period from a past time to a present time,
   wherein upon receipt of updating of a setting value, via the input means, the setting value including said planning cycle and at least one of said procurement lead time and said plan lead time, the demand predicting means calculates a planned demand value of a second past time period based on an actual demand value of a first past time period stored in the data storage means,
   wherein the actual value retrieval means retrieves and sums actual demand values corresponding to the second past time period stored in the data storage means,
   wherein the predicted remainder calculating means calculates a predicted remainder which is a difference between the planned demand value of the second past time period and the actual demand value of the second past time period,
   wherein a process is performed in which the demand predicting means calculates a planned demand value of a fourth past time period, which is different from the second past time period, based on an actual demand value of a third past time period stored in the data storage means, which is different from the first past time period, the actual value retrieval means retrieves and sums actual demand values corresponding to the fourth past time period, and the predicted remainder calculating means calculates a predicted remainder from the planned demand value of the fourth past time period and the actual demand value of the fourth past time period to obtain a new sample of the predicted remainder,
   wherein the process of calculating a predicted remainder is repeatedly performed for different past time periods until a number of samples of predicted remainders satisfying a criterion has been obtained,
   wherein the parameter calculating means calculates the parameter of standard deviation based on a plurality of the samples of the predicted remainders obtained by the repeated process of calculating a predicted remainder, and
   wherein the safety stock calculating means newly calculates a safety stock based upon the parameter of standard deviation and the updated setting value, each time the setting value is updated, to thereby update a current safety stock.

2. An inventory control system according to claim 1, wherein each of the stored second and fourth past time periods is a time period substantially same as a planned range which is a sum of the planning cycle, the procurement lead time and the plan lead time.

* * * * *